United States Patent
Magnusson

(10) Patent No.: US 7,106,535 B2
(45) Date of Patent: Sep. 12, 2006

(54) METHOD AND APPARATUS FOR MAINTAINING CONSISTENT TRACK PITCH IN HELICAL SCAN RECORDER

(75) Inventor: Steven L. Magnusson, Boulder, CO (US)

(73) Assignee: Exabyte Corporation, Boulder, CO (US)

( * ) Notice: Subject to any disclaimer, the term of this patent is extended or adjusted under 35 U.S.C. 154(b) by 0 days.

(21) Appl. No.: 10/441,289

(22) Filed: May 20, 2003

(65) Prior Publication Data

US 2003/0234998 A1 Dec. 25, 2003

Related U.S. Application Data

(63) Continuation-in-part of application No. 10/131,499, filed on Apr. 25, 2002.

(60) Provisional application No. 60/286,012, filed on Sep. 12, 2001.

(51) Int. Cl.
G11B 15/14 (2006.01)
G11B 5/09 (2006.01)

(52) U.S. Cl. .................. 360/64; 360/48; 360/77.13
(58) Field of Classification Search ................. 360/60, 360/64, 48, 77.13
See application file for complete search history.

(56) References Cited

U.S. PATENT DOCUMENTS

| | | | |
|---|---|---|---|
| 4,510,533 A | | 4/1985 | Tokuyama et al. |
| 4,597,023 A | * | 6/1986 | Rijckaert .................. 360/77.14 |
| 4,835,628 A | | 5/1989 | Hinz et al. |
| 4,843,495 A | | 6/1989 | Georgis et al. |
| 4,845,577 A | | 7/1989 | Georgis et al. |
| 4,868,692 A | | 9/1989 | Nakase et al. |
| 5,050,018 A | | 9/1991 | Georgis et al. |
| 5,065,261 A | | 11/1991 | Hughes et al. |
| 5,068,757 A | | 11/1991 | Hughes et al. |
| 5,142,422 A | | 8/1992 | Zook et al. |
| 5,191,491 A | | 3/1993 | Zweighaft |
| 5,313,346 A | | 5/1994 | Shimotashiro et al. |

(Continued)

FOREIGN PATENT DOCUMENTS

JP 02247801 A * 10/1990

OTHER PUBLICATIONS

U.S. Appl. No. 09/761,658, filed Jan. 18, 2001, entitled Phase Based Time Domain Tracking for Helical Scan Tape Drive.

(Continued)

*Primary Examiner*—Wayne Young
*Assistant Examiner*—Daniell L. Negrón
(74) *Attorney, Agent, or Firm*—Nixon & Vanderhye, P.C.

(57) ABSTRACT

New helical recording scanner architectures and transducing methods provide a consistent track pitch for helical tracks despite positional errors in placement of transducing elements (or sets of transducing elements) from their nominal positioning. The new scanners (85) are rotatable scanners having a vertical direction parallel to an axis of rotation of the scanner. Both first and second transducing elements are mounted on the scanner, and a tape drive (30) which comprises the scanner also includes a transport system for transporting magnetic tape (31) proximate the rotatable scanner in a manner so that information is transduced in helical tracks by the transducing elements during revolutions of the scanner. A width of the transducing elements and the nominal positioning of the transducing elements with respect to the vertical direction are selected so that the tracks transduced by the first transducing element and the second transducing element have a desired pitch regardless of an error between the nominal positioning and actual positioning of at least one of the first transducing element and the second transducing element.

31 Claims, 33 Drawing Sheets

U.S. PATENT DOCUMENTS

| | | | |
|---|---|---|---|
| 5,325,246 A | | 6/1994 | Guisinger et al. |
| 5,341,248 A | | 8/1994 | Amada et al. |
| 5,459,617 A | * | 10/1995 | Yanagihara .................. 360/21 |
| 5,535,068 A | | 7/1996 | Hughes |
| 5,602,694 A | | 2/1997 | Miles et al. |
| 5,680,269 A | | 10/1997 | Georgis et al. |
| 5,689,382 A | | 11/1997 | Hughes |
| 5,726,826 A | | 3/1998 | Miles et al. |
| 5,731,921 A | | 3/1998 | Hughes et al. |
| 5,734,518 A | | 3/1998 | Hughes |
| 5,953,177 A | | 9/1999 | Hughes |
| 5,973,875 A | | 10/1999 | Hughes et al. |
| 5,978,165 A | | 11/1999 | Magnusson |
| 6,144,518 A | | 11/2000 | Magnusson |
| 6,154,332 A | * | 11/2000 | Yanagawa et al. ............ 360/64 |
| 6,263,151 B1 | * | 7/2001 | Nishijima et al. ............ 386/68 |
| 6,288,864 B1 | | 9/2001 | Widener et al. |
| 6,344,981 B1 | | 2/2002 | Norton, Jr. et al. |

OTHER PUBLICATIONS

U.S. Appl. No. 10/131,499, filed Apr. 25, 2002 entitled "Alternating-Azimuth Angle Helical Track Format Using Grouped Same-Azimuth Angle Heads".

International Search Report and Written Opinion mailed Nov. 3, 2004 in corresponding PCT application PCT/US04/15736.

International Preliminary Examination Report mailed Dec. 8, 2005 in corresponding PCT Application No. PCT/US2004/015736.

UK Examination Report mailed Jan. 25, 2006 in corresponding UK application No. GB0520444.1.

* cited by examiner

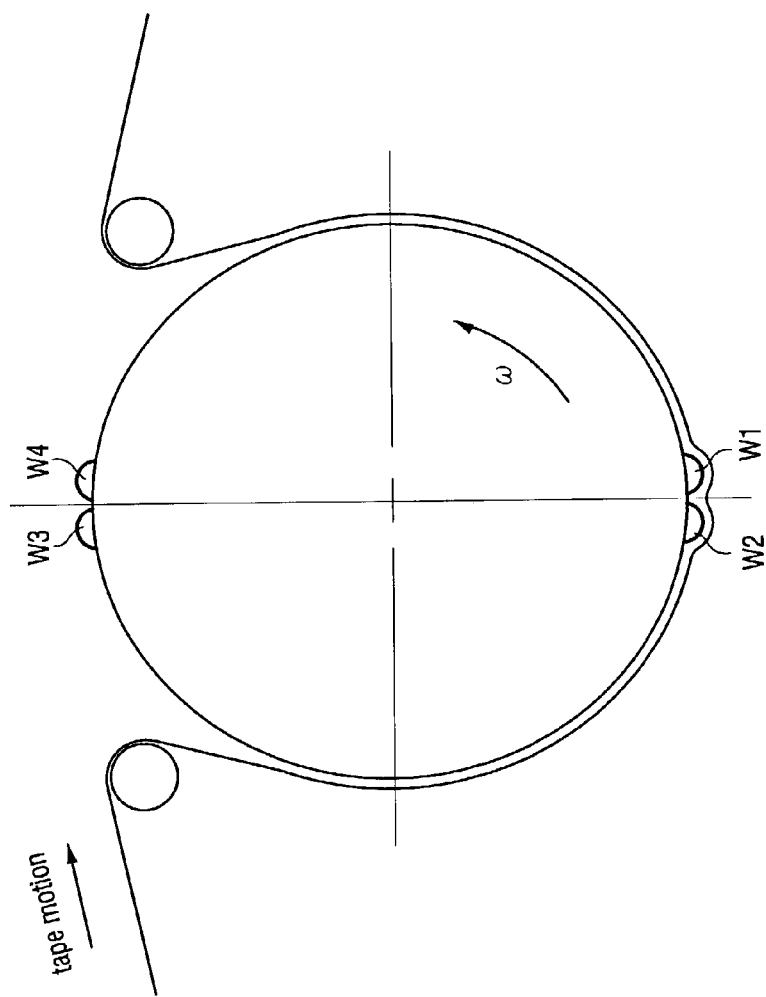
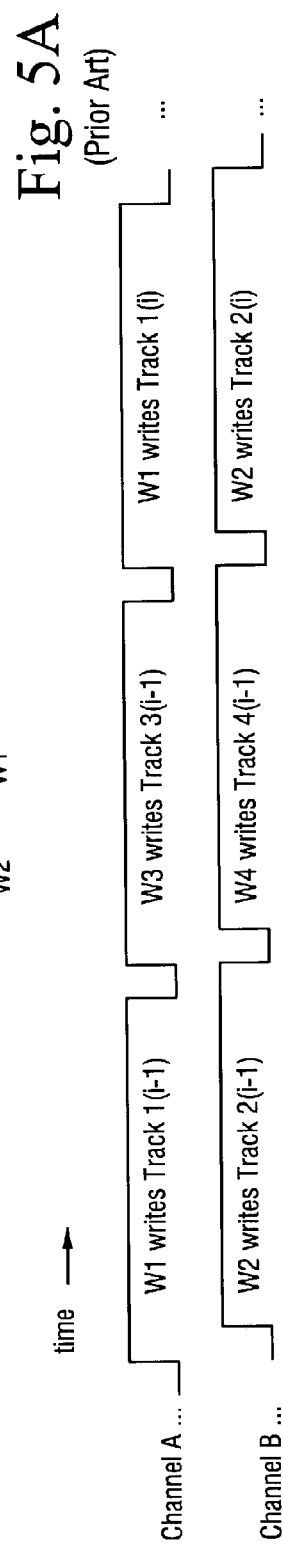
Fig. 5 (Prior Art)
Fig. 5A (Prior Art)

Nominal Track Pattern
(WA passes a distance of ½ P below the previous WB scan)

Track Pattern with Error Δ between WA and WB
(WA passes a distance of ½ P + Δ below the previous WB scan)

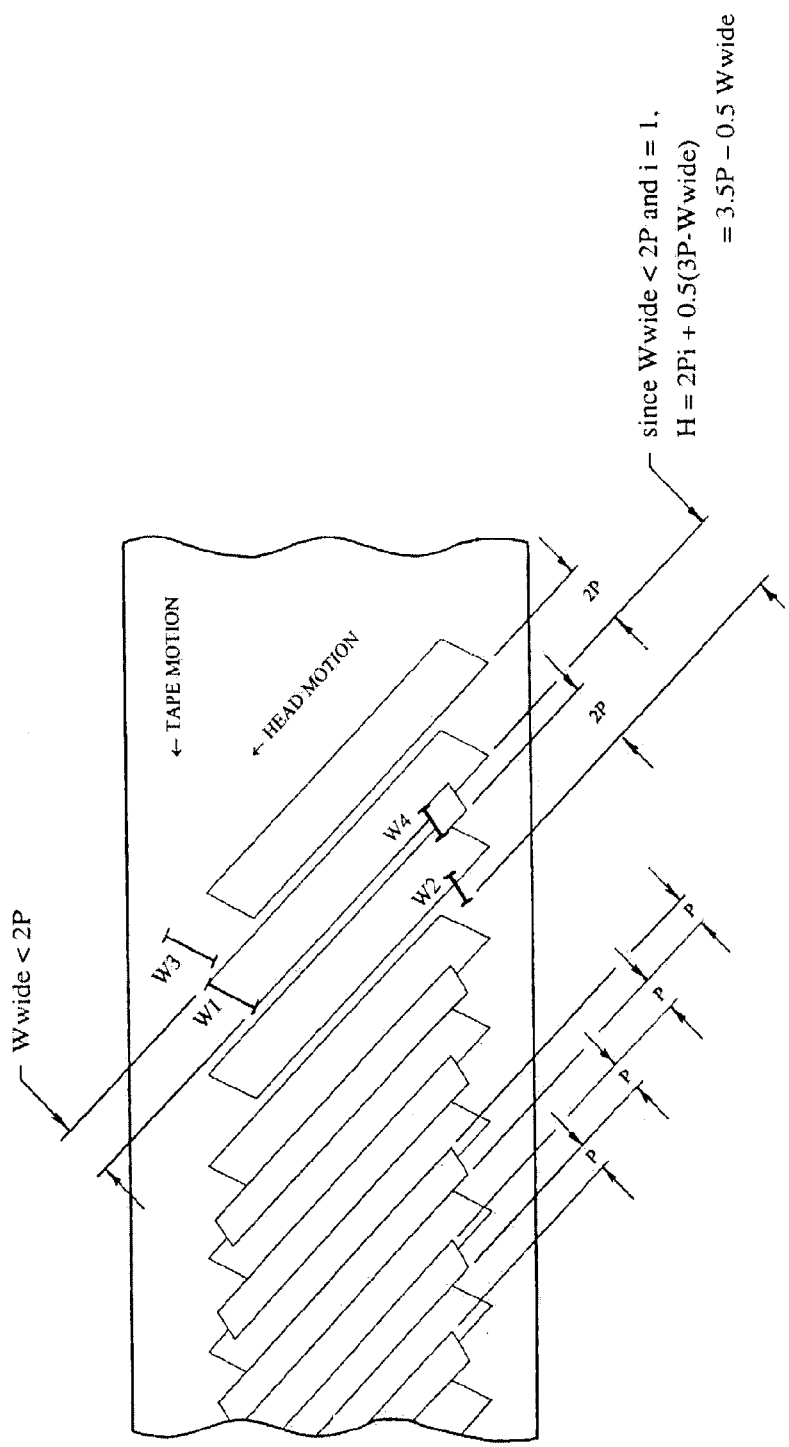

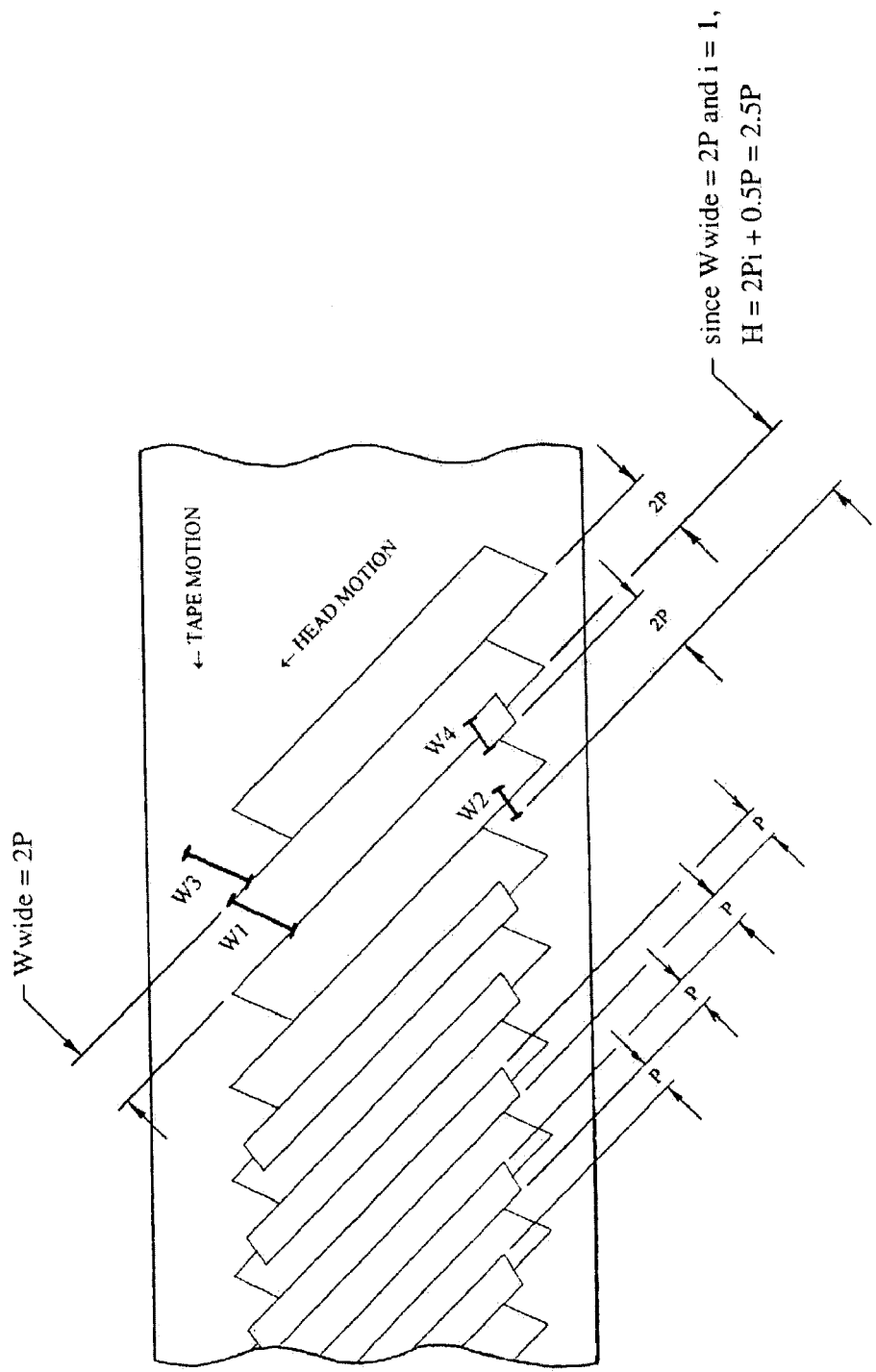

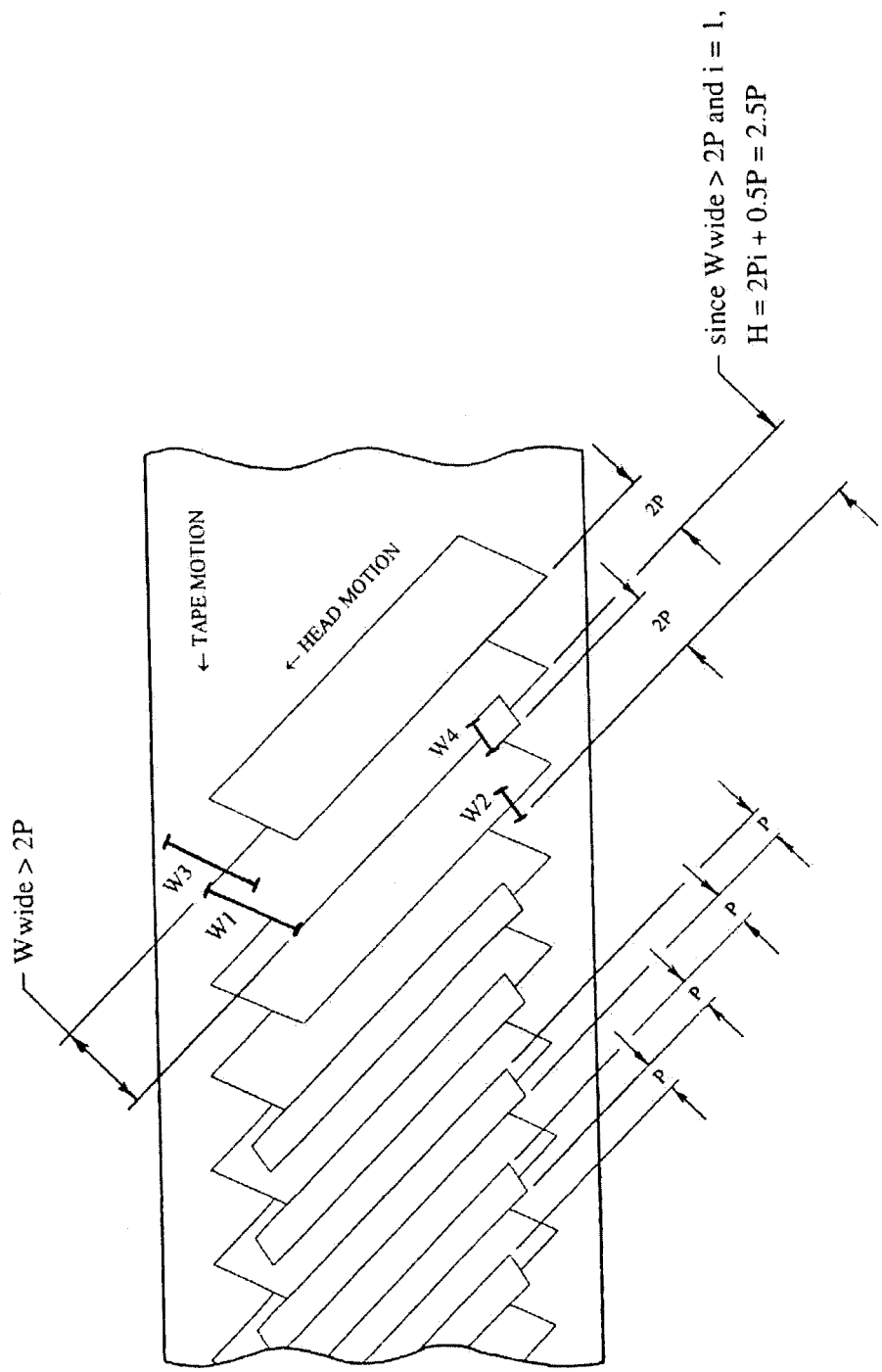

METHOD AND APPARATUS FOR MAINTAINING CONSISTENT TRACK PITCH IN HELICAL SCAN RECORDER

BACKGROUND

This application is a continuation-in-part application of U.S. patent application Ser. No. 10/131,499, filed Apr. 25, 2002, which in turn claimed the priority and benefit of U.S. Provisional patent application No. 60/286,012, filed Sep. 12, 2001, both of which are incorporated herein by reference in their entirety.

FIELD OF THE INVENTION

The present invention pertains to pertains to magnetic recording, and particularly to apparatus which record/reproduce an alternating-azimuth recorded track pattern on magnetic tape.

RELATED ART AND OTHER CONSIDERATIONS

In magnetic recording on tape using a magnetic tape drive, relative motion between a scanner [typically a drum or rotor with both one or more write element(s) and one or more read element(s)] and the tape causes a plurality of tracks of information to be transduced with respect to the tape. The magnetic tape is typically housed in a cartridge which is loaded into the tape drive. The tape extends between a cartridge supply reel and a cartridge take-up reel. The tape drive typically has a supply reel motor for rotating the cartridge supply reel and a take-up reel motor for rotating the cartridge take-up reel, so that the rotating of the reels causes, e.g., a linear transport or travel of the magnetic tape.

In a helical scan arrangement, the magnetic tape is transported so as to be at least partially wrapped around the scanner during a portion of the path of travel of the tape. Transducing elements (e.g., write elements and read elements) are positioned on the drum to physically record or reproduce data on the tape in a series of discrete stripes oriented at an angle with respect to the direction of tape transport. Typically one or more of the transducing elements are situated on a structure which is often referred to as a module or head or head unit, with the modular structure in turn being mounted on the periphery of the scanner. The data is formatted, prior to recording on the tape, to provide sufficient referencing information to enable later recovery during readout by one or more read transducing elements.

Examples of helical scan apparatus (e.g., helical scan tape drives) are described in the following non-exhaustive and exemplary list of United States Patents, all of which are incorporated herein by reference in their entirety: U.S. Pat. No. 5,065,261; U.S. Pat. No. 5,068,757; U.S. Pat. No. 5,142,422; U.S. Pat. No. 5,191,491; U.S. Pat. No. 5,535,068; U.S. Pat. No. 5,602,694; U.S. Pat. No. 5,680,269; U.S. Pat. No. 5,689,382; U.S. Pat. No. 5,726,826; U.S. Pat. No. 5,731,921; U.S. Pat. No. 5,734,518; U.S. Pat. No. 5,953,177; U.S. Pat. No. 5,973,875; U.S. Pat. No. 5,978,165; U.S. Pat. No. 6,144,518; and, U.S. Pat. No. 56,288,864.

In some (if not most) helical scan drives, the tracks are transduced to have alternating-azimuth track patterns. That is, the tracks are recorded in a sequentially overlapping fashion in both time and space with a "+" azimuth track, followed by a "−" azimuth track, followed by a "+" azimuth track, followed by a "−" azimuth track, and so forth.

Alternating-azimuth track patterns have been routinely used in both analog (e.g., VHS, Betamax, etc.) and digital helical tape recording format since the mid 1970s. Examples of digital helical tape recording formats are DDS, D-2, DCT, D-3, 850X, and Mammoth™.

On some existing helical tape drives (DDS or VHS for example), two write elements of similar (effective) width are mounted 180° apart on the rotating drum and are set vertically (in the direction parallel to the rotation axis of the drum) such that the edge of each write element (the edge that is not subsequently overlapped by the following track) are nominally coplanar. FIG. 1A shows the top view of such a rotating drum with write elements WA and WB, while FIG. 1B shows vertical positions of the write elements WA and WB. With this arrangement, each subsequent write element pass is nominally above the previous write element pass by a distance of 1P (where P is equal to the nominal desired track pitch or width). The nominal written track pitch varies proportionally with the linear tape speed so formats with different nominal track pitches can be generated with the same drum by selecting format operating points with different linear tape speeds and/or drum rotation speeds. For the tape drive configuration of FIG. 1A and FIG. 1B, FIG. 2A shows how a small track pitch $P_{small}$ results when the tape drive is operated at a slow linear tape speed, while FIG. 2B shows how a large track pitch $P_{large}$ results when the tape drive is operated at a fast linear tape speed.

However, in this existing method any error in the vertical height between the two write elements (e.g., element WA and element WB) results in one of the recorded tracks being larger than the nominal track pitch and the other recorded track being smaller than the nominal track pitch (or vice-a-versa depending on the direction of the vertical error). FIG. 3 shows vertical head positions of write elements WA and WB on a scanner in an example in which the edge of the WA (+ azimuth) write element is not perfectly coplanar with the edge of the WB (− azimuth) write element, but rather the edge of the WA (+ azimuth) write element is slightly below the edge of the WB (− azimuth) write element by an error Δ. Consequently, as shown in FIG. 4, all tracks written by the WA head are P+Δ wide (after being overlapped by the following WB track), and all tracks written by the WB head are P−Δ wide (after being overlapped by the following WA track).

FIG. 5 shows an example of a particular helical scanner architecture which uses this sequential (prior art) recording method. In this architecture, commercially embodied in the Mammoth™-2 helical scan drive, the four write elements (W1, W2, W3, W4) mounted on the periphery of a rotatable drum or "scanner" are grouped into two local modules of two elements each (a first module with elements W1, W2; a second module with elements W3, W4). The two modules are separated by 180°. Since the recorded track length corresponds to about 180° of the drum's rotation, the signals for the four write transducing elements can be efficiently supplied by only two signal channels. The timing of the signals for the respective write transducing elements W1, W2, W3, and W4 are as shown in FIG. 5A.

FIG. 6 shows a view of the magnetic tape surface for the Mammoth™-2 helical scan tape drive, and serves to illustrate the "sequential" nature of the time and position relationships of the recorded tracks. In FIG. 6, the W1 transducing element (+ azimuth) is just finishing writing Track 1$i$. The W2 transducing element (− azimuth) is closely following the W1 transducing element while it writes Track 2$i$ in an overlapping fashion. On the scanner, the vertical height from the bottom of the W1 transducing element to the bottom of the W2 transducing element is adjusted nominally such that the W2 transducing element follows a path on the tape the distance "P" above the path of the W1 transducing element as shown in the FIG. 6. The W3 transducing element (+ azimuth) is just at the start of what will become Track 3*i*. The vertical height from the bottom of the W1 transducing element to the bottom of the W3 transducing element is adjusted nominally such that the W3 transducing element follows a path on the tape the distance "2P" above the path of the W1 transducing element. The W4 transducing element (− azimuth) will closely follow the W3 transducing element while it writes Track 4*i* in an overlapping fashion. The vertical height from the bottom of the W3 transducing element to the bottom of the W4 transducing element is adjusted nominally such that the W4 transducing element follows a path the distance "P" above the W3 transducing element as shown in FIG. 6.

Repeating this process (+ azimuth write, followed by − azimuth write, followed by + azimuth write, followed by − azimuth write, etc.) produces a recording which comprises a series of alternating-azimuth tracks, with each track being of nominal width P.

One problem with the approach described above is that it is difficult to hold the positional relationship between the W1/W2 head module and the W3/W4 head module, particularly since these modules are separated by a relatively large physical distance. When there is an error, "Δ", between the W1/W2 head module and the W3/W4 head module, the recorded track pattern is severely affected as shown in FIG. 7. In this example, the vertical height from the W1 transducing element to the W3 transducing element is such that the W3 transducing element follows a path not 2P, but rather, 2P−Δ from the W1 transducing element path. Consequently, the width of every Track 2 is reduced to P−Δ, and the width of every Track 4 is increased to P+Δ.

What is needed, therefore, and an object of the present invention, is a helical scan drive apparatus and method of operating the same which will transduce tracks of proper pitch despite a variation or error in vertical separation of transducing elements (or, when the transducing elements are grouped into modules, a variation or error in vertical separation of the modules).

BRIEF SUMMARY

New helical recording scanner architectures and transducing methods provide a consistent pitch for helical tracks despite positional errors in placement of transducing elements (or sets of transducing elements) from their nominal positioning. The new scanners are rotatable scanners having a vertical direction parallel to an axis of rotation of the scanner, both first and second transducing elements being mounted on the scanner. A tape drive which comprises the scanner also includes a transport system for transporting magnetic tape proximate the rotatable scanner in a manner so that information is transduced in helical tracks by the transducing elements during revolutions of the scanner. A width of the transducing elements and the nominal positioning of the transducing elements with respect to the vertical direction are selected so that the tracks transduced by the first transducing element and the second transducing element have a desired width regardless of an error between the nominal positioning and actual positioning of at least one of the first transducing element and the second transducing element.

The transducing elements may be included in or mounted on a module or unit, and as such may comprise a "set" of transducing elements (with one or more transducing elements comprising a set). The new scanner architecture is generically applicable to embodiments having one transducing element per set, as well as to embodiments having N number of transducing elements per set (e.g., N number of write gaps (e.g., write transducing elements) per set or module (N being an integer greater than zero).

General formulae are provided to specify the nominal positioning of the modules (sets), and thus for the transducing elements, which assures consistent track pitch despite an error between nominal positioning and actual positioning. The formulae assume that the desired track pitch is P; that a first transducing element is mounted on or otherwise comprises a first module with the first transducing element having an effective width Wnarrow=1.0P; that the second transducing head is mounted on or otherwise comprises a second module with the second transducing element having an effective width Wwide>1.0P; and, that the first module scans the tape following the second module. In accordance with the general formulae, the nominal positioning with respect to the vertical direction of the first module relative to the second module is selected so that on the tape a bottom edge of a bottom-most transducing element of the first module follows a path which is below a bottom edge of a bottom-most track just previously recorded by the second module by a distance H. The value of the distance H is H=2Pi+0.5(3P−Wwide) when Wwide is greater than 1.0P but less than 2.0P; the value of H is H=2Pi+0.5P when Wwide is greater than or equal to 2.0P (i being a non-negative integer in both expressions for H).

In one embodiment in which the width of the first transducing element is P and the width of the second transducing element is 2P, the nominal positioning of the transducing elements is such that a reference point (e.g., bottom edge) on the first transducing element is separated in the vertical direction by a distance which causes the first transducing element to travel a path on the tape which is nominally ½ P below a previous path of the second transducing element. When the first transducing element and the second transducing element are separated angularly about the scanner by 180 degrees, the nominal positioning of the transducing elements is such that the reference point on the first transducing element is separated in the vertical direction by a distance substantially equal to 1.5P from a corresponding reference point on the second transducing element.

Utilization of the new scanner architecture assures that all tracks transduced by the first transducing element and the second transducing element have a desired width regardless of an error in physical distance separating the sets of transducing elements (or, in a case in which the transducing elements are mounted on modules or sets, an error in physical distance separating the modules).

In the new scanner architecture and transducing method, for a head module or "set" which has N number of write gaps (e.g., write transducing elements) of the same azimuth where N is 2 or greater, tracks are written in a new temporal order: N number of tracks having the first azimuth orientation, followed by N number of tracks having the second azimuth orientation, followed by N number of tracks having the first azimuth orientation, etc. Yet the spatial order of the tracks on the tape is such that the tracks alternate in azimuth orientation between the first azimuth orientation and the second azimuth orientation. The number of temporally consecutive transduced tracks of the same azimuth depends on the number of transducing elements employed. In an example in which four transducing elements are utilized, two of the transducing element having the first azimuth orientation (e.g., a positive ("+") azimuth orientation) and two of the transducing elements having the second azimuth orientation (e.g., a negative ("−") azimuth orientation), i.e., N=2, the temporal order of transducing is a positive ("+") azimuth track, followed by another positive ("+") azimuth track, followed by a negative ("−") azimuth track, followed by another negative ("−") azimuth track (and then this pattern repeats). Yet the spatial order of the tracks on the tape is still +, −, +, −, +, etc.

The new temporal order of track transducing is illustrated by an example scanner in which the first module further comprises a third transducing element; the second module further further comprises a fourth transducing element; with the modules being mounted on the scanner so that the first tranducing element and the third transducing element transduce respective tracks during a first angular phase of the rotation of the scanner, and the second transducing element and the fourth transducing element transducing, during a second angular phase of the rotation of the scanner, respective tracks which partially overlap a previously-transduced track, and with the tracks on the tape alternating according to differing azimuthal orientation. In this embodiment, the transducing elements of the first module have a first azimuthal orientation and the transducing elements of the second module have a second azimuthal orientation which is different from the first azimuthal orientation. The modules are mounted on the scanner so the second transducing element transduces a track which partially overlaps a track transduced by the first transducing element and a track transduced by the third transducing element.

The architecture and transducing methods are applicable to helical scan drives which are capable of writing two different track patterns with different track pitch sizes, e.g., $P_1$ and $P_2$, where $P_1$ is less than $P_2$. For example, the tracks having the first track pitch $P_1$ can be transduced by a tape drive which operates in accordance with a first recording format or first type tape technology, while the tracks having the second track pitch $P_2$ can be transduced by a tape drive which operates in accordance with a second recording format or second type tape technology.

In the selective dual track pitch architecture and transducing methods, a first group of transducing elements are mounted on the scanner for use in transducing tracks of a first track pattern (the tracks of the first track pattern having a first pattern nominal track pitch $P_1$) and a second group of transducing elements are mounted on the scanner for use in transducing tracks of a second track pattern (the tracks of the second track pattern having a second pattern nominal track pitch $P_2$). In consistent manner with the generic structure, the transducing elements are situated on the scanner at predetermined nominal positions whereby, regardless of which group is selected as the utilized group, the tracks transduced by the utilized group have a consistent track pitch regardless of an error in physical distance separating the transducing elements of the utilized group (e.g., regardless of an error between the nominal positioning and actual positioning of the transducing elements of the utilized group).

In the selective dual track pitch architecture and transducing methodology, the first and second groups of transducing elements each comprise a first azimuthal angle orientation transducing element (e.g., positive azimuthal angle orientation transducing element) and a second azimuthal angle orientation transducing element (e.g., negative azimuthal angle orientation transducing element). Regardless of utilization of either the first group or the second group is employed, an alternating azimuthal track pattern is transduced. Preferably the first azimuthal angle orientation transducing element of the first group has an effective transducing width substantially equal to the first pattern nominal track pitch ($P_1$) and a second azimuthal angle orientation transducing element of the first group has an effective transducing width substantially equal to twice the first pattern nominal track pitch ($2P_1$); the first azimuthal angle orientation transducing element of the second group has an effective transducing width substantially equal to the second pattern nominal track pitch ($P_2$) and a second azimuthal angle orientation transducing element of the second group has an effective transducing width substantially equal to twice the second pattern nominal track pitch ($P_2$).

In a first embodiment of the dual track pitch scanning architecture and methodology, the predetermined nominal positions are such that, during a transducing operation: (1) the first azimuthal angle orientation transducing element of the first group travels a first predetermined distance below a previous track transduced by the second azimuthal angle orientation transducing element of the first group, the first predetermined distance related to the first pattern nominal track pitch $P_1$, e.g., $2P_1 i + 0.5 P_1$ (with i=0, 1, 2, . . . ); and (2) the first azimuthal angle orientation transducing element of the second group travels a second predetermined distance below a previous track transduced by the second azimuthal angle orientation transducing element of second first group, the second predetermined distance being related to the second pattern nominal track pitch $P_2$, e.g., $2P_2 i + 0.5 P_2$ (with i=0, 1, 2, . . . ). For example, in one illustrated implementation the first azimuthal angle orientation transducing element of the first group has a vertical separation with respect to the second azimuthal angle orientation transducing element of the first group equal to 1.5 times the first pattern nominal track pitch, and the first azimuthal angle orientation transducing element of the second group has a vertical separation with respect to the second azimuthal angle orientation transducing element of the first group equal to 1.5 times the second pattern nominal track pitch.

In second and third embodiments of the dual track pitch scanning architecture and methodology, the first group comprises a first azimuthal angle orientation transducing element of the first group and the second group comprises a first azimuthal angle orientation transducing element of the second group, and a common transducing element which belongs to the first group and the second group, the common transducing element being a second azimuthal angle orientation transducing element.

In a second example embodiment of the dual track pitch scanning architecture and methodology, the first azimuthal angle orientation transducing element of the first group has an effective transducing width substantially equal to the first pattern nominal track pitch ($P_1$); the first azimuthal angle orientation transducing element of the second group has an effective transducing width substantially equal to the second pattern nominal track pitch ($P_2$); the common transducing element, having the second azimuthal angle orientation, has an effective transducing width substantially equal to twice the second pattern nominal track pitch ($2*P_2$); and the predetermined nominal positions are such that, during a transducing operation: (1) the first azimuthal angle orientation transducing element of the first group travels a first predetermined distance below a previous track transduced by the common transducing element, the first predetermined distance being $2P_1 i + 0.5 P_1$ (with i=0, 1, 2, . . . ); and (2) the first azimuthal angle orientation transducing element of the second group travels a second predetermined distance below a previous track transduced by the common transducing element, the second predetermined distance being $2P_2i+0.5P_2$ (with i=0, 1, 2, . . . ).

In a third example embodiment of the dual track pitch scanning architecture and methodology (for those cases where $P_2$ is approximately equal to $2*P_1$), the first azimuthal angle orientation transducing element of the first group has an effective transducing width substantially equal to the first pattern nominal track pitch ($P_1$); the first azimuthal angle orientation transducing element of the second group has an effective transducing width substantially equal to twice the second pattern nominal track pitch ($2P_2$); the common transducing element, having the second azimuthal angle orientation, has an effective transducing width substantially equal to the second pattern nominal track pitch ($P_2$=approx $2P_1$); and the predetermined nominal positions are such that, during a transducing operation: (1) the first azimuthal angle orientation transducing element of the first group travels a first predetermined distance below a previous track transduced by the common transducing element of the first group, the first predetermined distance being $2P_1i+0.5P_1$ (with i=0, 1, 2, . . . ); and (2) the common transducing element travels a second predetermined distance below a previous track transduced by the first azimuthal angle orientation transducing element of the second group, the second predetermined distance being $2P_2i+0.5P_2$ (with i=0, 1, 2, . . . ).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5 is diagrammatic view of an example prior art helical scanner architecture having four write transducing elements grouped into two local modules and which uses a prior art sequential recording method.

FIG. 5A is a diagrammatic view showing signals for a helical scan tape drive having an architecture such as that of FIG. 5.

FIG. 18A–FIG. 18C are diagrammatic views of three segments of magnetic tape with corresponding three different examples of track patterns produced by other various embodiments of the new scanner architecture.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

In one of its aspects, the present invention provides a new helical head/scanner physical and timing architecture which produces an alternating-azimuth (+, −, +, −, . . . ) recorded track pattern on the tape and provides an efficient electrical signal structure, yet the recorded track pattern is not adversely affected by a height error between the far-separated transducing elements or sets (modules) of transducing elements positioned on a scanner or rotating drum. In the new scanner architecture and transducing method, for a head module or "set" which has N number of write gaps (e.g., write transducing elements) of the same azimuth where N is 2 or greater, tracks are written in a new temporal order: N number of tracks having the first azimuth orientation, followed by N number of tracks having the second azimuth orientation, followed by N number of tracks having the first azimuth orientation, etc. Yet the spatial order of the tracks on the tape is such that the tracks alternate in azimuth orientation between the first azimuth orientation and the second azimuth orientation. The number of temporally consecutive transduced tracks of the same azimuth depends on the number of transducing elements employed. In an example in which four transducing elements are utilized, two of the transducing element having the first azimuth orientation (e.g., a positive ("+") azimuth orientation) and two of the transducing elements having the second azimuth orientation (e.g., a negative ("−") azimuth orientation), the temporal order of transducing is a positive ("+") azimuth track, followed by another positive ("+") azimuth track, followed by a negative ("−") azimuth track, followed by another negative ("−") azimuth track (and then this pattern repeats). Yet the spatial order of the tracks on the tape is still +, −, +, −, +, etc.

Figure 1B:
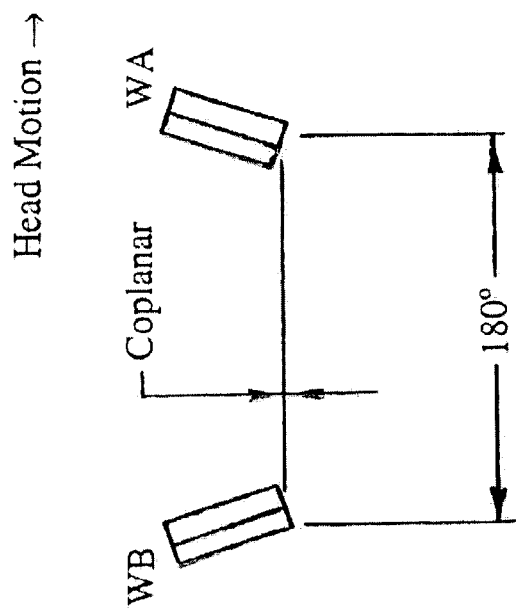
FIG. 1B is a schematic view showing ideal vertical positions of the write elements of the rotating drum of FIG. 1A.
Figure 1A:
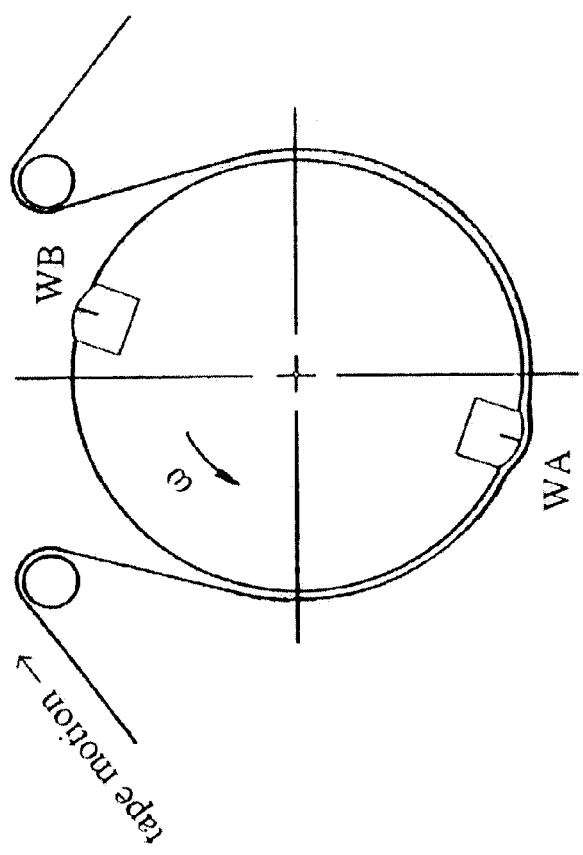
FIG. 1A is a top diagrammatic view of a portion of a prior-art rotating drum with two write elements.
Figure 2B:
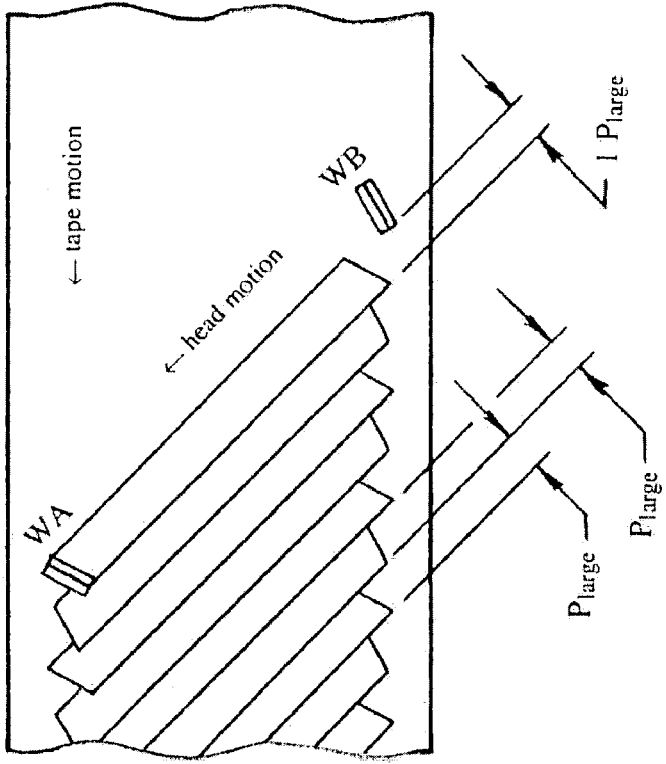
FIG. 2B is a diagrammatic view of a segment of magnetic tape transduced by a helical scan drive having the rotating drum of FIG. 1A wherein the magnetic tape is transported at a fast linear tape speed.
Figure 2A:
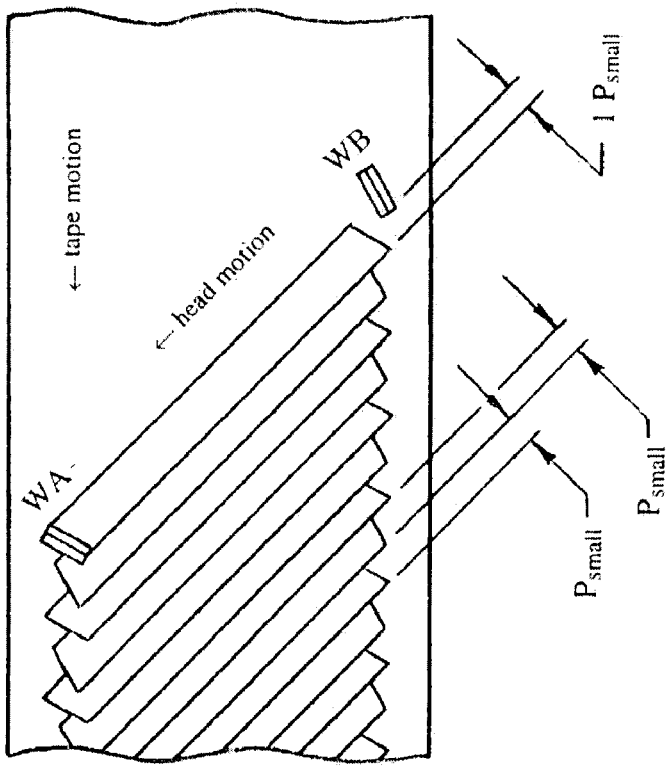
FIG. 2A is a diagrammatic view of a segment of magnetic tape transduced by a helical scan drive having the rotating drum of FIG. 1A wherein the magnetic tape is transported at a slow linear tape speed.
Figure 4:
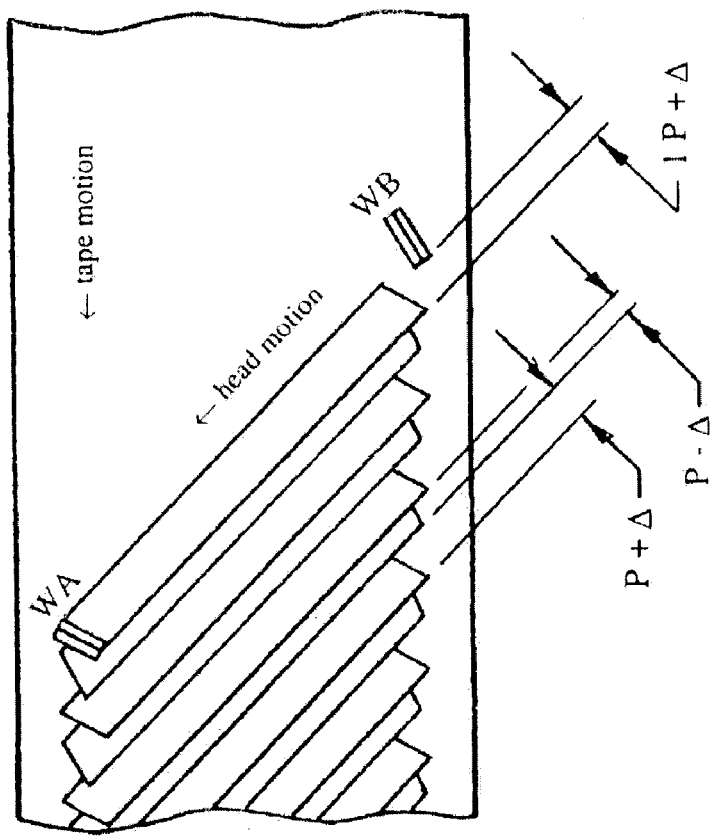
FIG. 4 is a diagrammatic view of a segment of magnetic tape transduced by a helical scan drive having a rotating drum of FIG. 1A with an error in vertical positions of its write elements.
Figure 3:
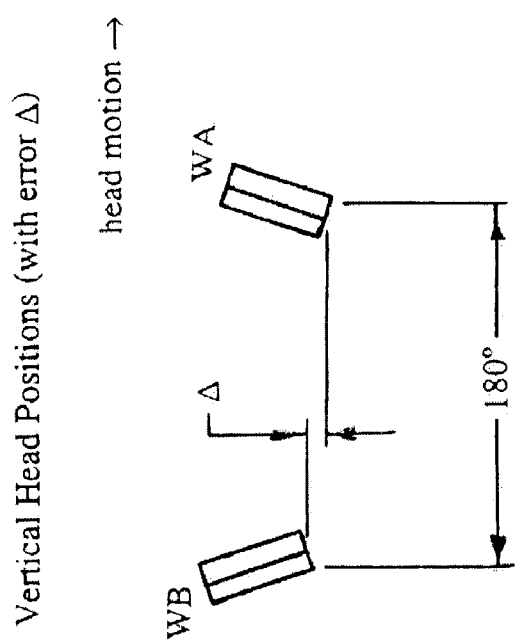
FIG. 3 is a schematic view showing an error which can occur in vertical positions of the write elements of a rotating drum like that of FIG. 1A.
Figure 6:
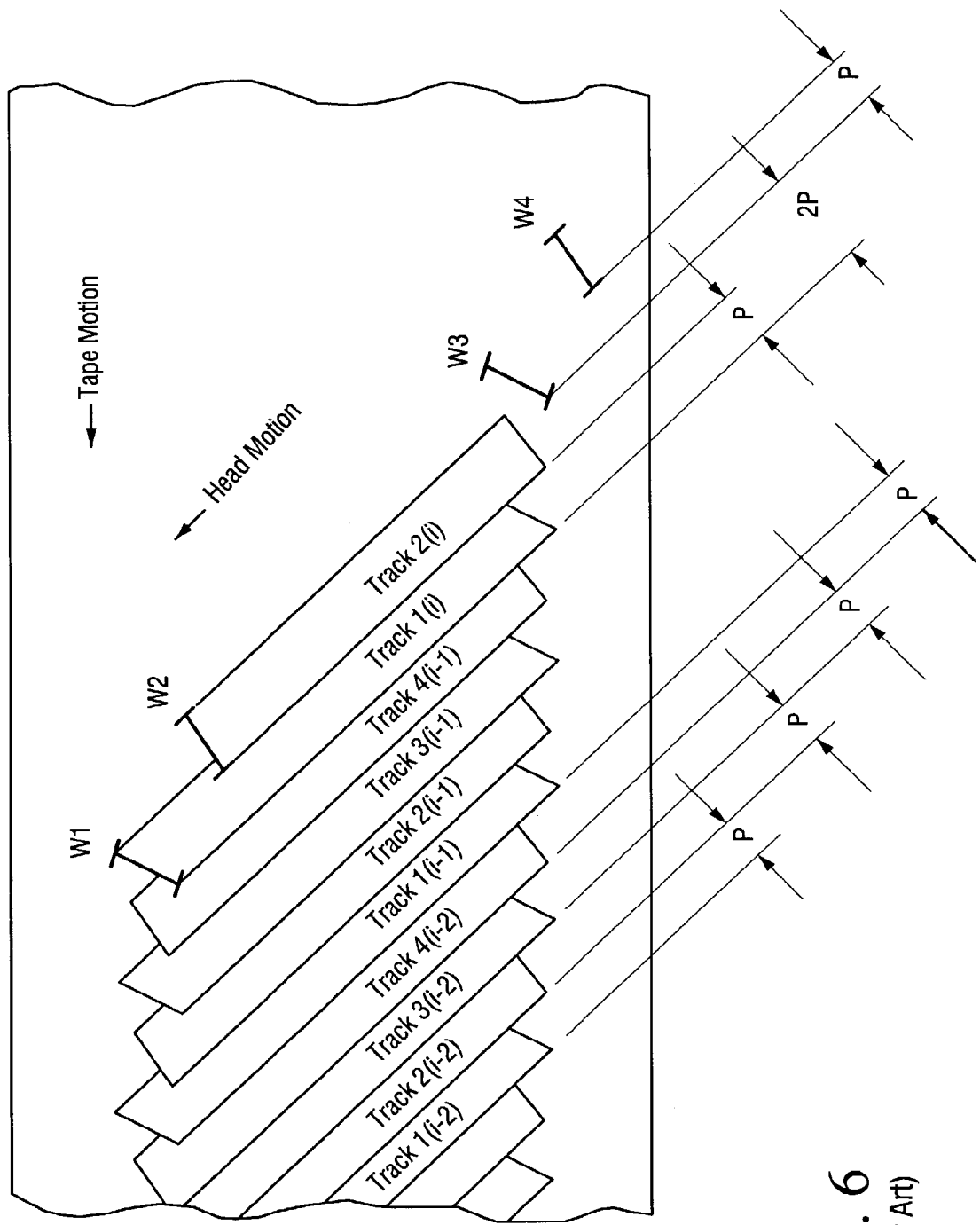
FIG. 6 is a diagrammatic view of a magnetic tape surface for a helical scan tape drive having an architecture such as that of FIG. 5.
Figure 7:
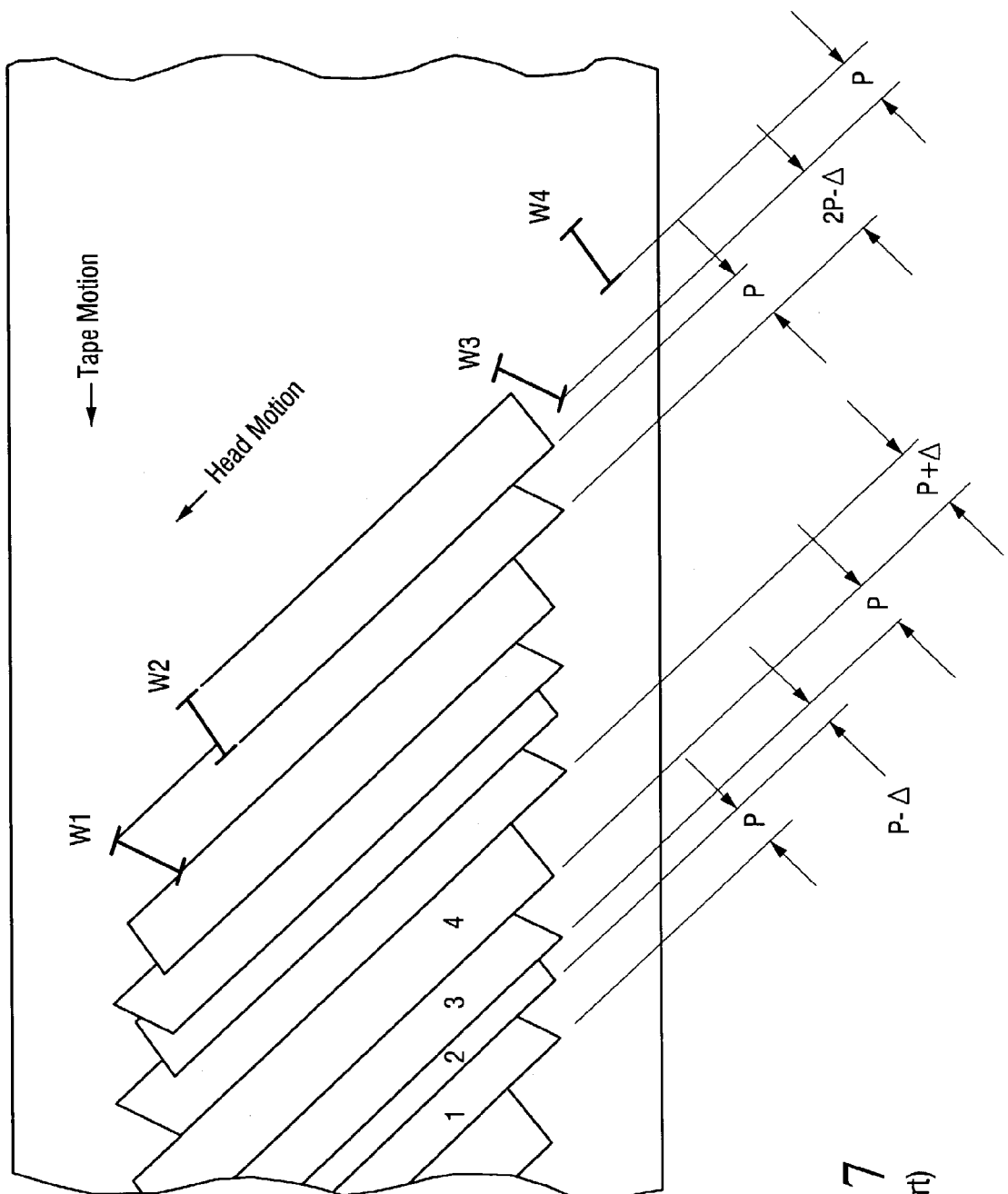
FIG. 7 is a diagrammatic view of a track pattern produced by a prior art tape drive and having a position error between head modules.
Figure 8:
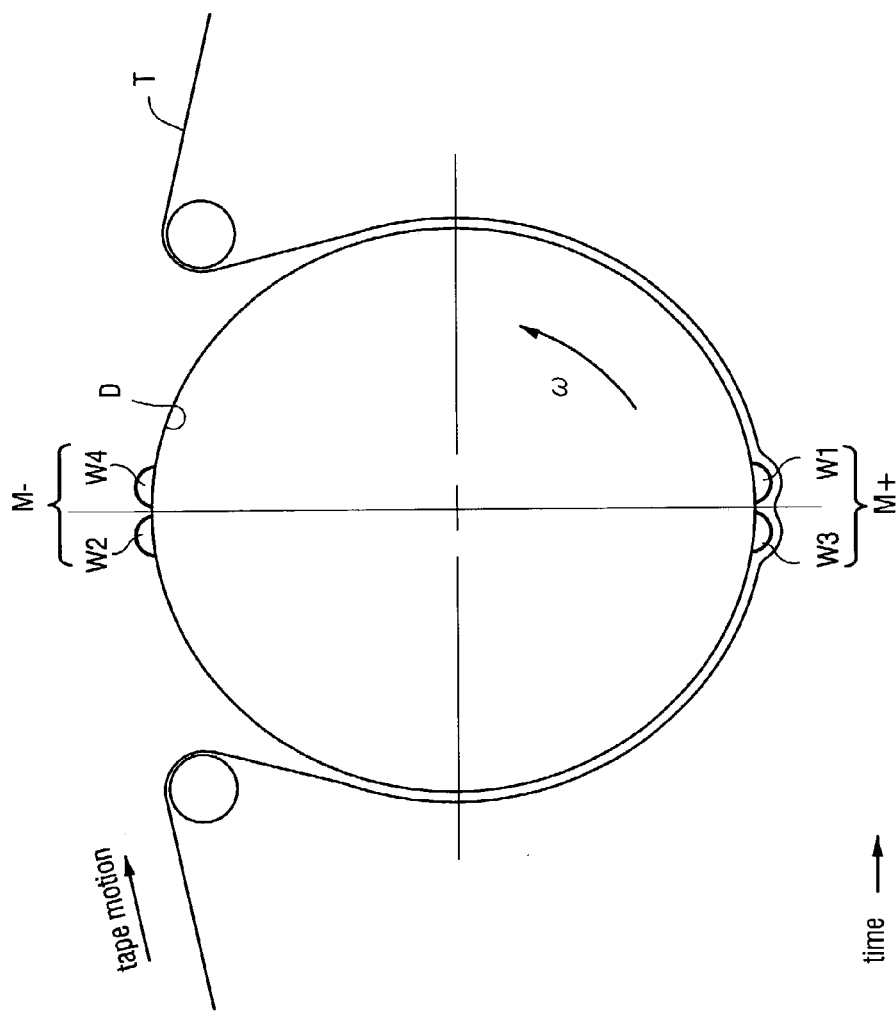
FIG. 8 is a diagrammatic view showing an illustrative example new scanner architecture according to one embodiment.
Figure 9:
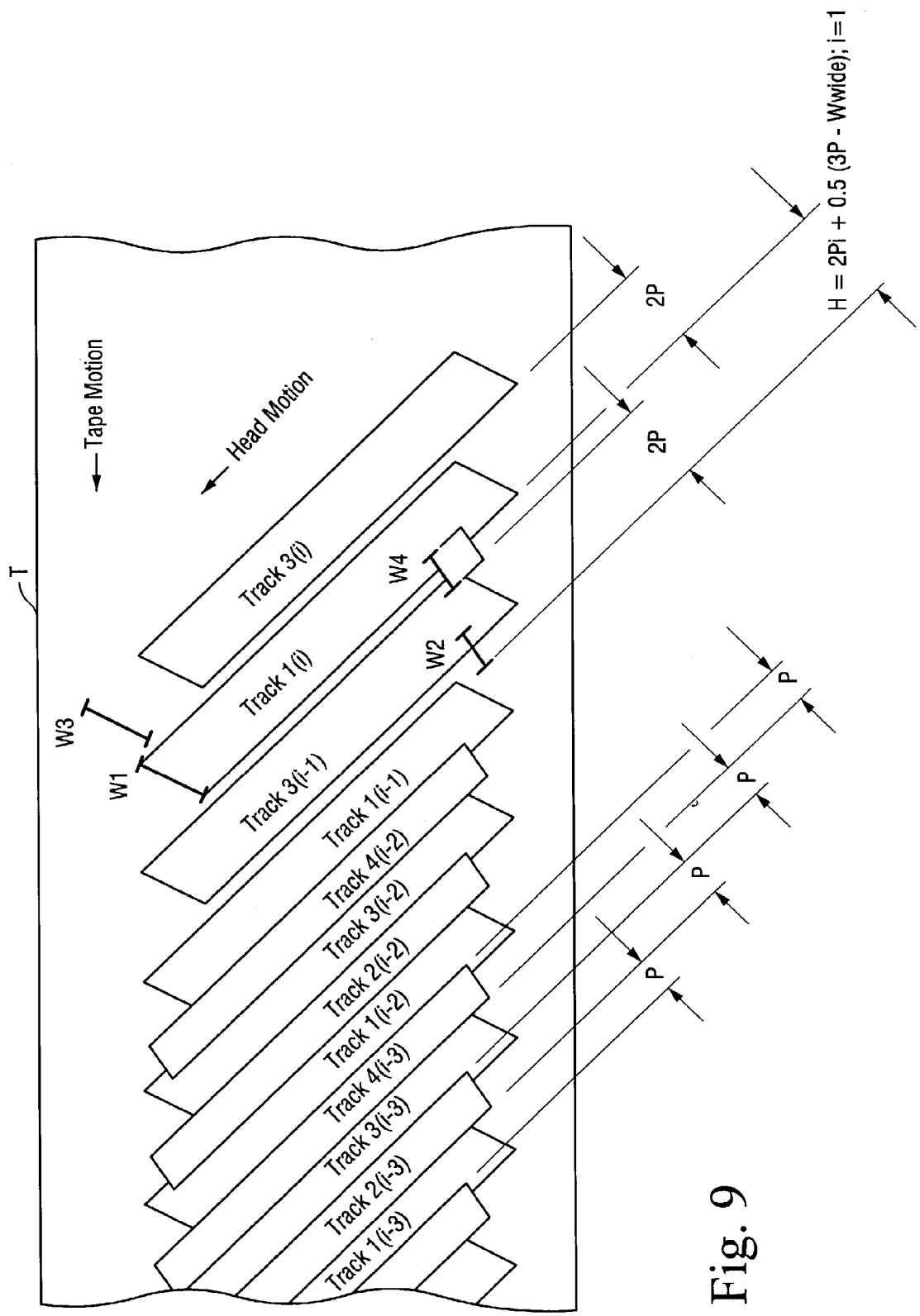
FIG. 9 is a diagrammatic view of a magnetic tape surface for a helical scan tape drive having the new scanner architecture of FIG. 8.

FIG. 8 shows an example new scanner architecture featuring a rotating drum D or "scanner" in which two positive ("+") azimuth write transducing elements, W1 and W3, are in one head set and two negative ("−") azimuth transducing elements, W2 and W4, are in another head set. Each set is also referred to as a module, e.g., transducing elements W1 and W3 are in a first set or first module (module $M_+$), while transducing elements W2 and W4 are in a second set or second module (module $M_-$). In FIG. 9, The nominal width of transducing elements W1 and W3 is shown as slightly less than 2P, but they could be 2P or larger than 2P. The nominal width of transducing elements W2 and W4 is P as shown in FIG. 9. P is the desired width of the tracks to be transduced by transducing elements W1–W4, also known as the track pitch. In an illustrated example but not limiting embodiment, P can be in a range of from about 3 µm to 10 µm in size.

Figure 8A:
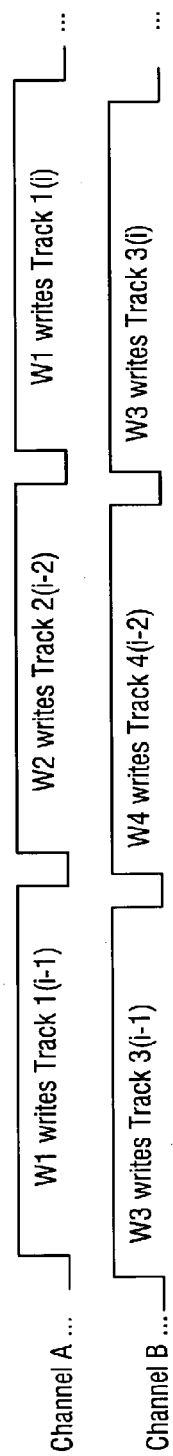
FIG. 8A is a diagrammatic view showing signals for a helical scan tape drive having an architecture such as that of FIG. 8.

If desired in some embodiments, the signals for the four write transducing elements can be efficiently supplied by only two signal channels (e.g., channel A and channel B) as shown in the timing diagram of FIG. 8A. In such embodiments, channel A is employed for the module $M_+$ (e.g., write transducing elements W1, W3); channel B is employed for the module $M_-$ (write transducing elements W2, W4).

A transport system transports magnetic tape T proximate the rotatable scanner or drum D in a manner so that information is transduced by at least one of the transducing elements during a revolution of the scanner. The transport system may be in accordance with any of numerous example implementations, some example non-limiting embodiments thereof being described below. For example, the revolution may have a first angular phase or revolution half in which the transducing elements of the first module $M_+$ are in contact with the tape for transducing information, and a second angular phase or revolution half in which the transducing elements of the second module $M_-$ are in contact with the tape for transducing information. In such examples preferably (but not necessarily) the first angular phase is offset from the second angular phase by essentially one hundred eighty degrees.

FIG. 9 shows a view of the magnetic tape surface T illustrating the new sequence of the time and position relationships for the recorded tracks for, e.g., the FIG. 8 embodiment. In FIG. 9, the W1 transducing element (+ azimuth) is just finishing writing Track 1(i). The W3 transducing element (+ azimuth) has just previously finished writing Track 3(i). On the scanner, the vertical height from the bottom of the W1 transducing element to the bottom of the W3 transducing element on the scanner is adjusted nominally such that the W3 transducing element follows a path on the tape the distance "2P" above the bottom of the W1 transducing element as shown in the FIG. 9. The W2 transducing element (− azimuth) is just at the start of what will become Track 2(*i*–1). The vertical height from the bottom of the W1 transducing element to the bottom of the W2 transducing element is adjusted nominally on the scanner such that the W2 transducing element follows a path on the tape the distance "H" below the path of the W1 transducing element, where H is defined by Expression 1.

$$H=2Pi+0.5(3P-Wwide); i=1.$$  Expression 1

The W4 transducing element (– azimuth) has just previously started writing Track 4(*i*–1). The vertical height from the bottom of the W4 transducing element to the bottom of the W2 transducing element is adjusted nominally on the scanner such that the W4 transducing element follows a path the distance "2P" above the W2 transducing element as shown in the FIG. 9.

Repeating this new process (+ azimuth write, followed by + azimuth write (or N+ write), followed by – azimuth write, followed by – azimuth write (or N– write), etc.) still produces a recording which comprises a series of alternating-azimuth tracks each of nominal width P. With this new approach, it may still be difficult to hold the positional relationship between the W1/W3 head module $M_+$ and the W2/W4 head module $M_-$ (since they are separated by a relatively large physical distance as before). However, if there is an error ("Δ") in the physical distance between the W1/W3 head module $M_+$ and the W2/W4 head module $M_-$, the recorded track pattern is not affected by the error in module vertical placement, as illustrated in FIG. 10.

Figure 10:
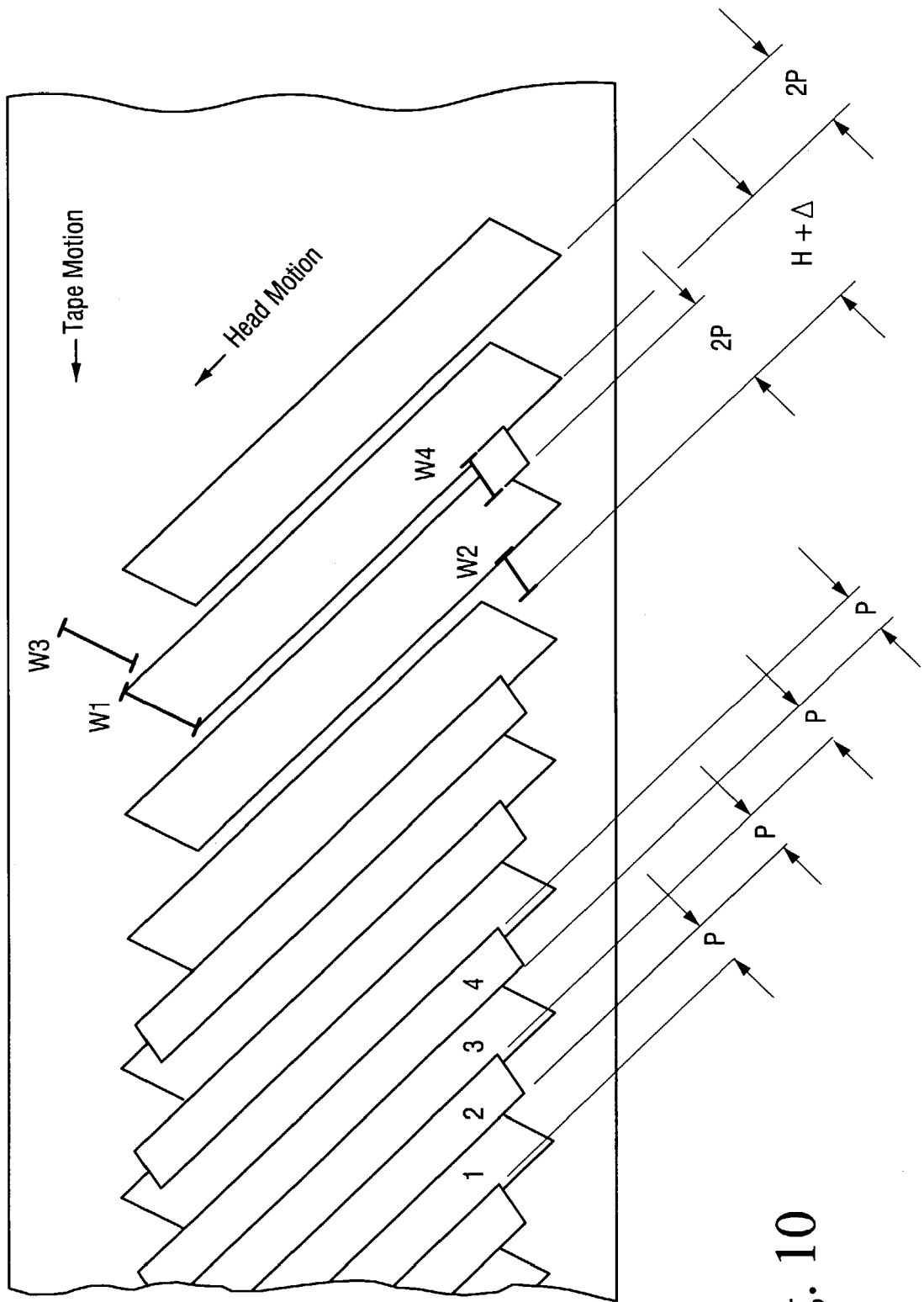
FIG. 10 is a diagrammatic view of a track pattern produced by a helical scan tape drive having the new scanner architecture of FIG. 8 and a position error between head modules.
Figure 11:
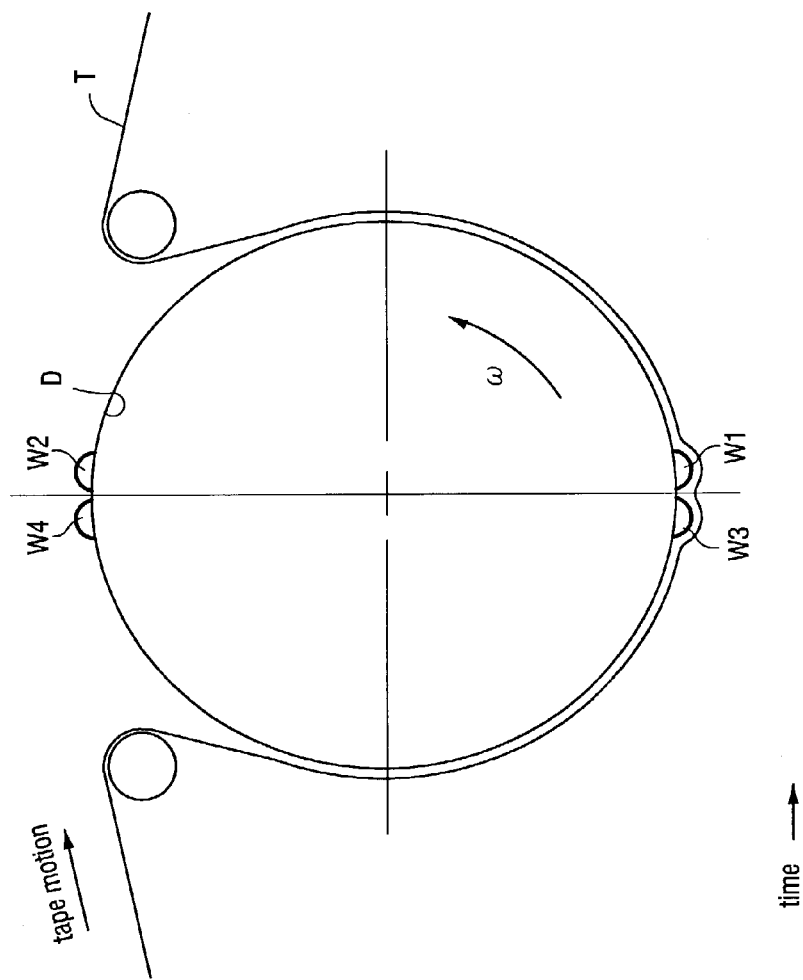
FIG. 11 is a diagrammatic view showing another illustrative example embodiment of a new scanner architecture.
Figure 11A:
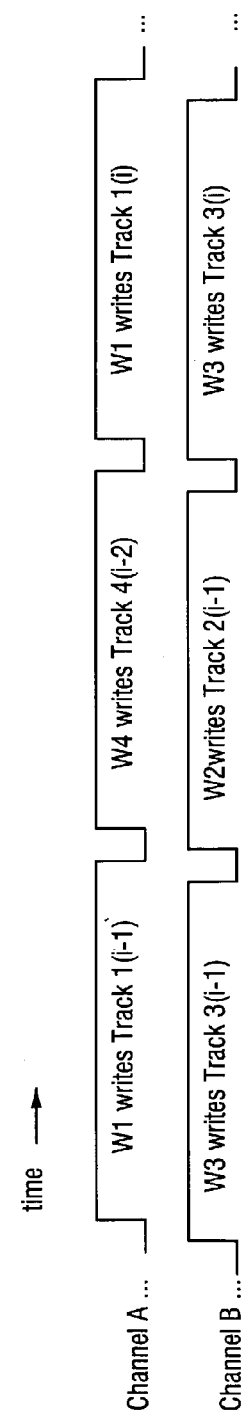
FIG. 11A is a diagrammatic view showing signals for a helical scan tape drive having an architecture such as that of FIG. 11.
Figure 12:
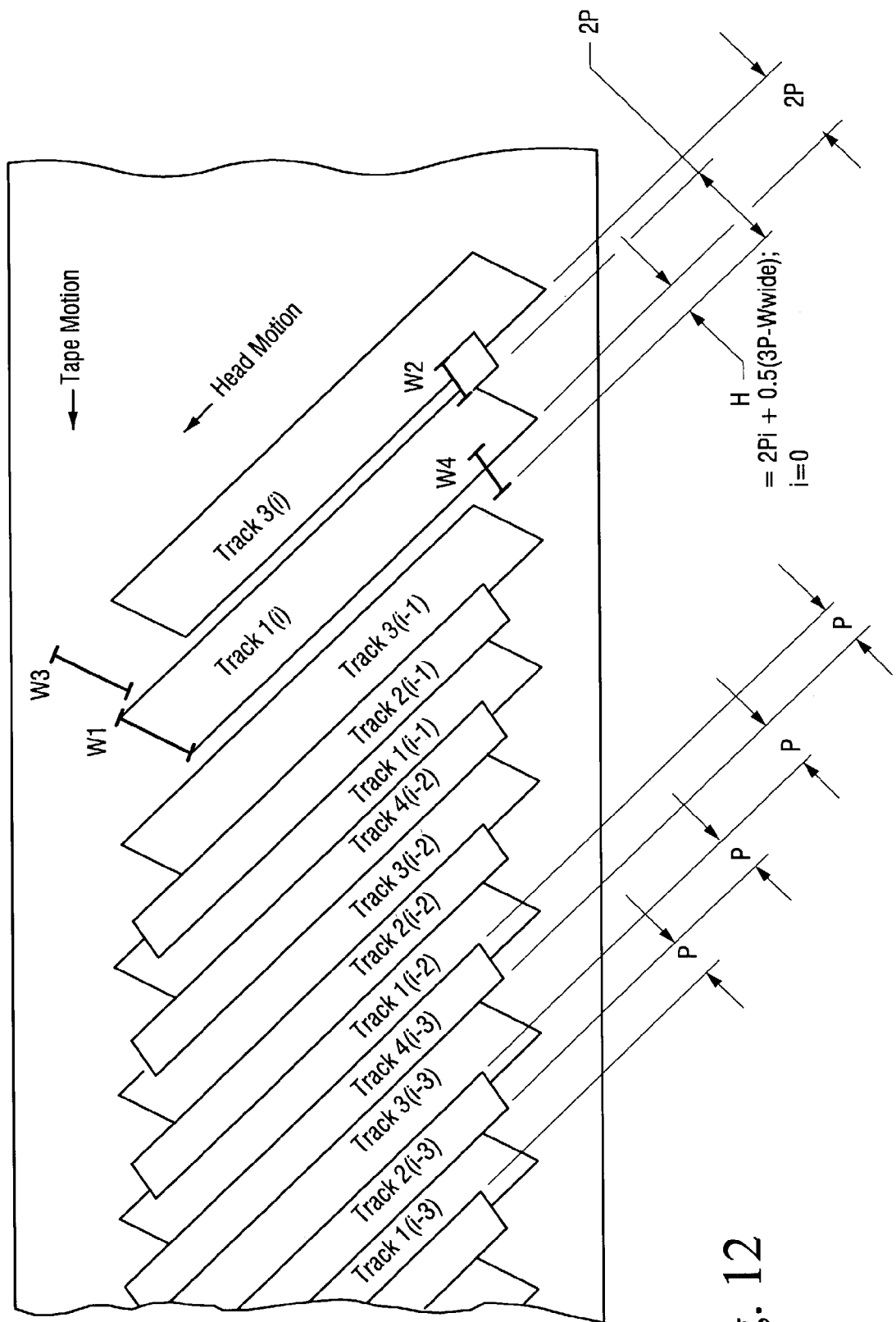
FIG. 12 is a diagrammatic view of a magnetic tape surface for a helical scan tape drive having the new scanner architecture of FIG. 11.
Figure 13:
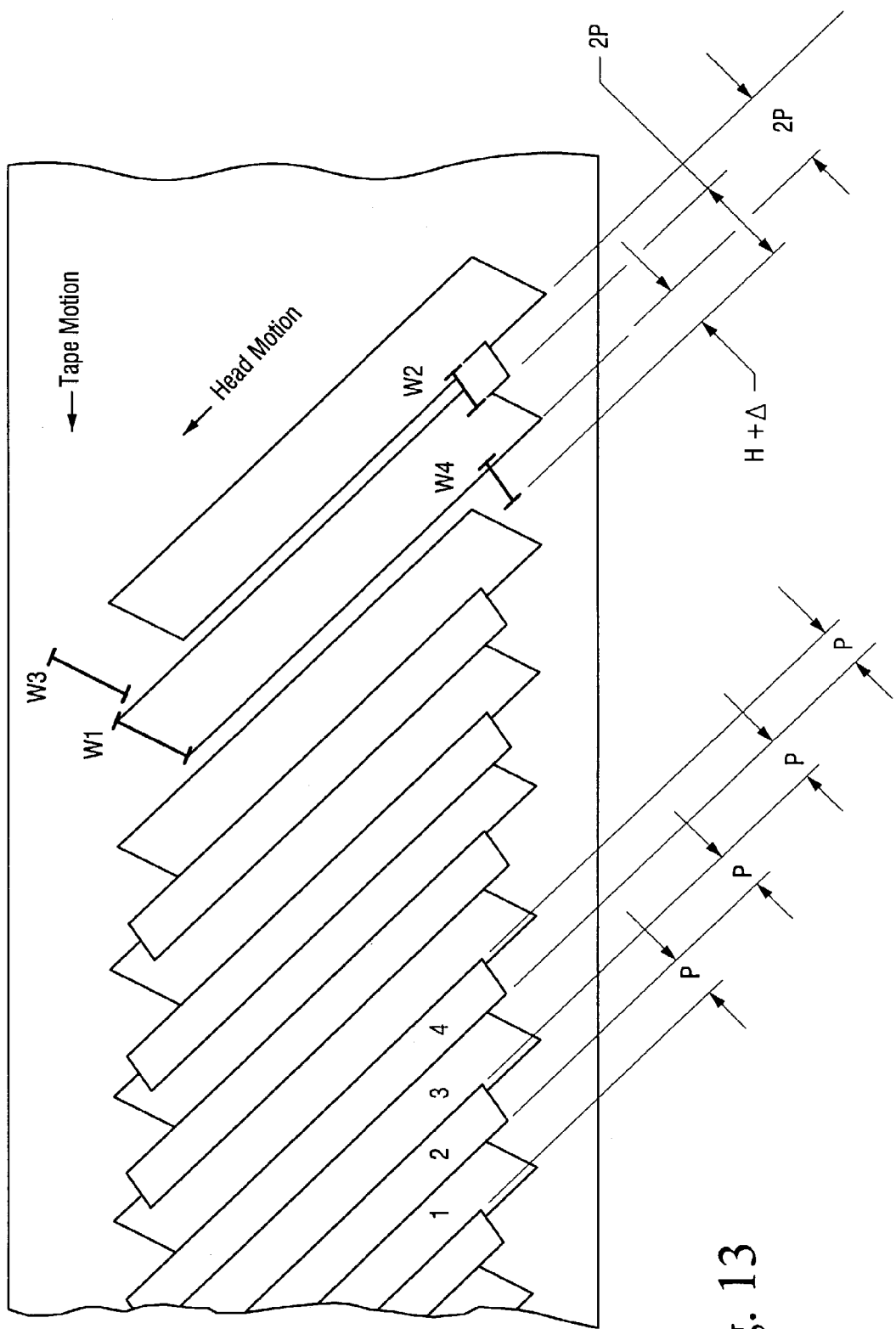
FIG. 13 is a diagrammatic view of a track pattern produced by a helical scan tape drive having the new scanner architecture of FIG. 11 and a position error between head modules.

In FIG. 10, the vertical height from the W1 transducing element to the W2 transducing element is such that the W2 transducing element incorrectly follows a path not H, but rather a path H+Δ from the W1 transducing element path. However, this incorrect transducing element mounting has no effect on the final recorded pattern and the width of every recorded track is still P. Thus, in the new scanner architecture a width of the transducing elements (e.g., W1, W2, W3, and W4) and a nominal positioning of the transducing elements with respect to the vertical direction are selected so that the tracks transduced by the transducing elements have a uniform desired width (i.e., width P in the FIG. 10 embodiment) regardless of an error between the nominal positioning and actual positioning of the far-separated sets of transducing elements.

FIG. 11, FIG. 11A, FIG. 12, and FIG. 13 show an alternate embodiment wherein the W2 transducing element is positioned above the W4 transducing element rather than below the W4 transducing element.

While the foregoing has been described using a helical format as an example and where the linear tape motion is in the same (general) direction as scanner transducing element motion (e.g., Mammoth-2, 850X, DDS, VHS), in a similar manner the foregoing is also applicable to helical tape formats where the linear tape motion moves in a (general) direction opposite to the direction of scanner transducing element motion (e.g., D-2 or Ampex DCT).

Figure 14:
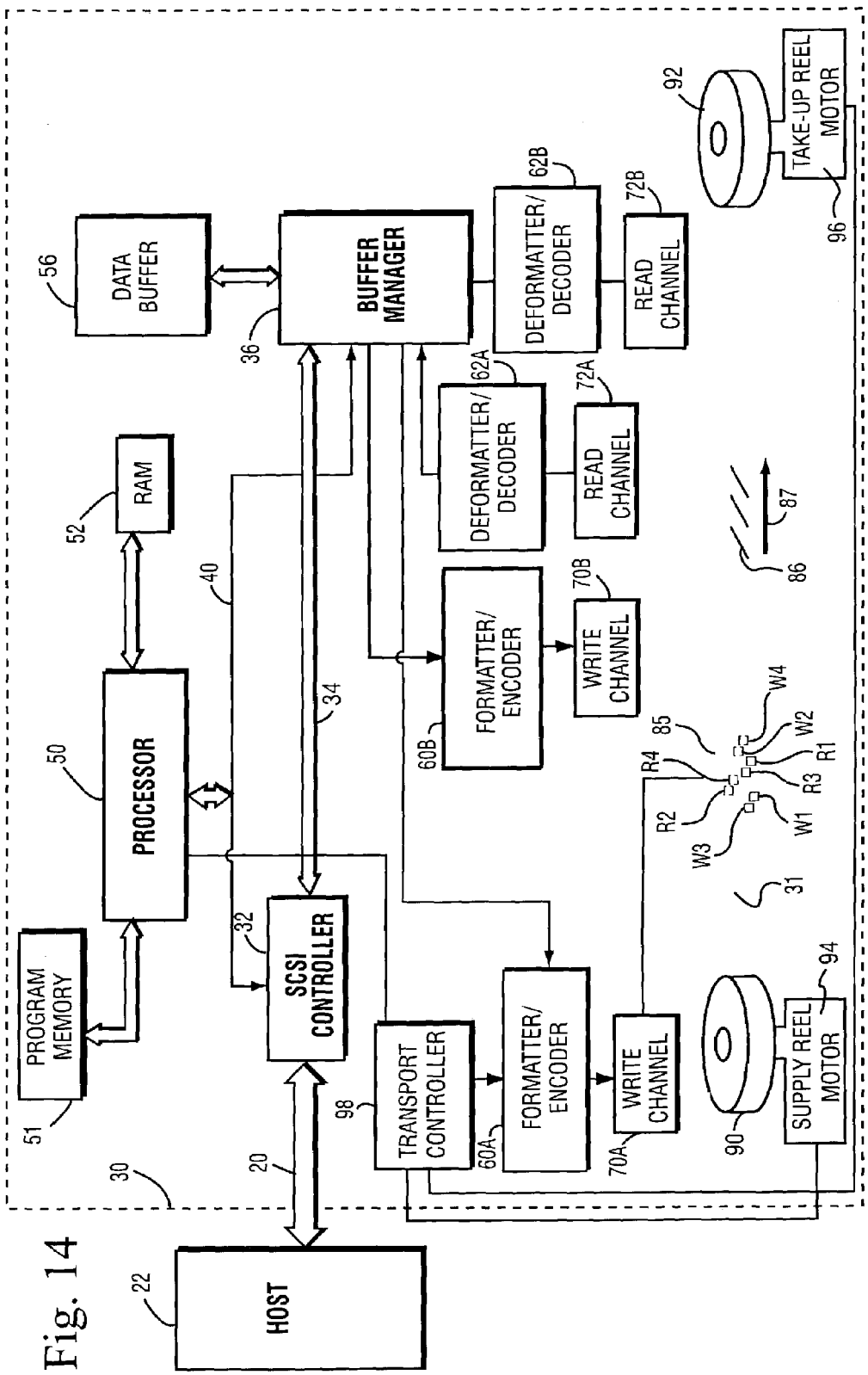
FIG. 14 is a schematic view of an example helical scan drive suitable for implementation of the new scanner architecture.

FIG. 14 illustrates an example, non-limiting, representative tape drive in which embodiments of the scanner configurations of the present invention can be deployed. FIG. 14 shows a SCSI bus 20 which connects a host computer 22 and a first embodiment of a SCSI target storage device, particularly tape drive 30. In the illustrated embodiment, an example tape drive 30 is shown as a generic helical scan tape drive which transduces information on/from tape 31. Tape drive 30 includes a SCSI controller 32 which is connected to SCSI bus 20. Data bus 34 connects SCSI controller 32 to buffer manager 36. Both SCSI controller 32 and buffer manager are connected by a bus system 40 to processor 50.

Processor 50 is also connected to program memory 51 and to a data memory, particularly RAM 52.

Buffer manager 36 controls, e.g., both storage of user data in buffer memory 56 and retrieval of user data from buffer memory 56. User data is data from host 22 for recording on tape 31 or destined from tape 31 to host 22. Buffer manager 36 is also connected to two formatter/encoders 60A, 60B and to two deformatter/decoders 62A, 62B. The formatter/encoder 60A is connected to a first write channel 70A (also known as write channel A), while the formatter/encoder 60B is connected to a second write channel 70B (also known as write channel B). The deformatter/decoder 62A is connected to a first read channel 72A (also known as read channel A), while the deformatter/decoder 62B is connected to a second read channel 72B (also known as read channel B).

The write channel 70A is connected to write transducing elements W1 and W2, while the write channel 70B is connected to the write transducing elements W3 and W4. Similarly, the read channel 72A is connected to read transducing elements R1 and R2, while the read channel 72B is connected to read transducing elements R3 and R4. The general criteria is that any channel (whether read or write) have only one transducing element from any module active at any one time so the channel can be shared by the modules. So it would also be possible to have write channel 70A is connected to transducing elements W1 and W4, while write channel B is connected to W3 and W2. The same criteria applies for the read transducing elements, e.g., read channel 72A could be connected to read transducing elements R1 and R2 while read channel 72B could be connected to read transducing elements R3 and R4. Alternatively, read channel 72A could be connected to read transducing elements R1 and R4 while read channel 72B is connected to read transducing elements R3 and R2.

Thus, the write transducing element W1,W3 and W2, W4 and the read transducing elements R1, R3 and R2, R4 are mounted on a peripheral surface of scanner 85, e.g., a rotatable drum or rotor. Tape 31 is wrapped around scanner 85 such that aforementioned transducing elements follow helical stripes 86 on tape 31 as tape 31 is transported in a direction indicated by arrow 87 from a supply reel 90 to a take-up reel 92. Supply reel 90 and take-up reel 92 are typically housed in an unillustrated cartridge or cassette from which tape 31 is extracted into a tape path that includes wrapping around scanner 85.

In one embodiment, a supply reel 90 and take-up reel 92 are driven by respective reel motors 94 and 96 to transport tape 31 in the direction 87. Reel motors 94 and 96 are driven by transport controller 98, which ultimately is governed by processor 50. Operation and control of the tape transport mechanism of this second type of tape drive including reel motors 94 and 96 is understood by the person skilled in the art with reference, for example, to U.S. Pat. No. 5,680,269 and incorporated herein by reference. Alternatively or additionally, the transport system can include a capstan which imparts motion to the tape 31.

In addition to write transducing elements and read transducing elements, scanner 85 can also have certain unillustrated electronics mounted thereon. The scanner-mounted electronics are understood with reference to U.S. patent application Ser. No. 09/761,658, filed Jan. 18, 2001, entitled "PHASE BASED TIME DOMAIN TRACKING FOR HELICAL SCAN TAPE DRIVE", and U.S. patent application Ser. No. 09/492,345, filed Jan. 27, 2000, entitled "POWER SUPPLY CIRCUIT AND METHOD OF CALIBRATION THEREFOR", both of which are incorporated herein by reference in their entirety.

The foregoing thus describes a new helical transducing element/scanner physical and timing architecture which produces an alternating-azimuth (+, −, +, −, . . . ) recorded track pattern on the tape and provides an efficient electrical signal structure, yet the recorded track pattern is not adversely affected by vertical height error between the far-separated write elements. Thus far this concept has been described for two write head modules with two write transducing elements each (i.e., four total write transducing elements). However, the concept of maintaining consistent track pitch despite vertical separation error can also be applied to two write head modules with one write transducing element each (i.e., two total write transducing elements). Thus, it should be understood that the terms "set" or "module" as used herein expressly encompasses (but is not restricted to) a set or module having only one write element or write transducing element.

Figure 15B:
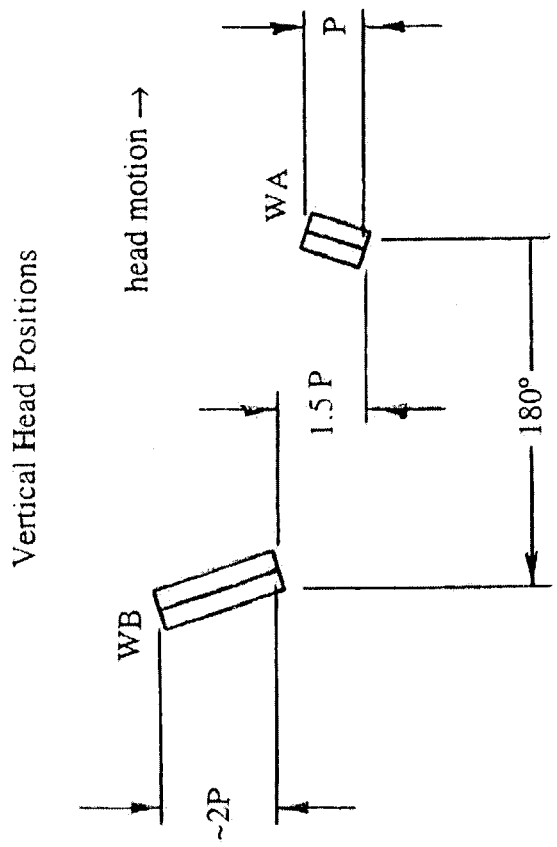
FIG. 15B is a schematic view showing vertical positions of the write elements of the rotating drum of FIG. 15A.
Figure 15A:
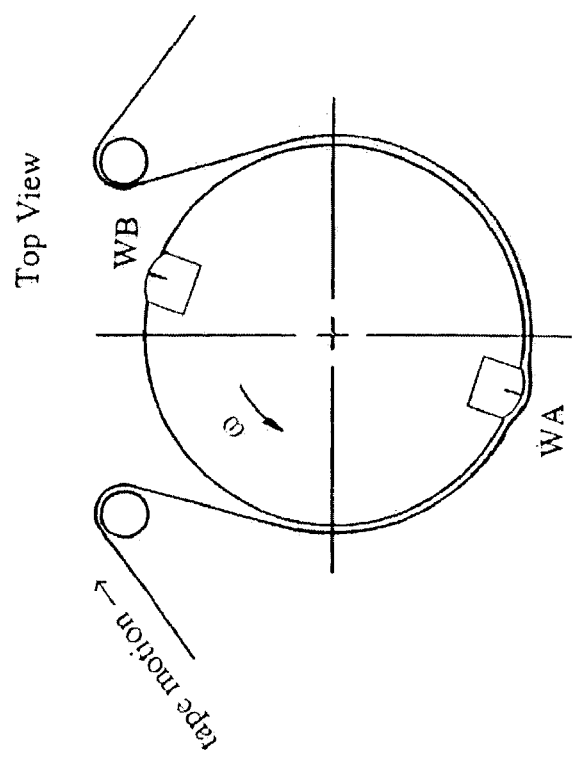
FIG. 15A is a top diagrammatic view of a portion of a rotating drum according to another embodiment

For example, FIG. 15A shows a drum having a first set with a first write element WA and a second set having a second write element WB. The first write element WA is also known as the smaller effective width write element; the second write element WB is known as the larger effective width write element. With respect to a pattern transduced on tape, the WA element is nominally positioned vertically to pass a distance ½ P below the previous WB transducing element scan on the tape. If the angle between the WA and WB elements around the axis of the drum is 180°, the nominal vertical distance from the WB element down to the WA element would be 1.5 P as shown in FIG. 15B. Yet at any WA-to-WB angular relationship, a corresponding nominal vertical height difference can be selected so that the WA element passes nominally ½ P below the previous WB element pass. The vertical height difference for the structure of FIG. 15A and FIG. 15B for the 180 degree angular separation happens to be 1.5 P, but could be another value (e.g., another multiple of P) for another angular separation distance.

Figure 16A:
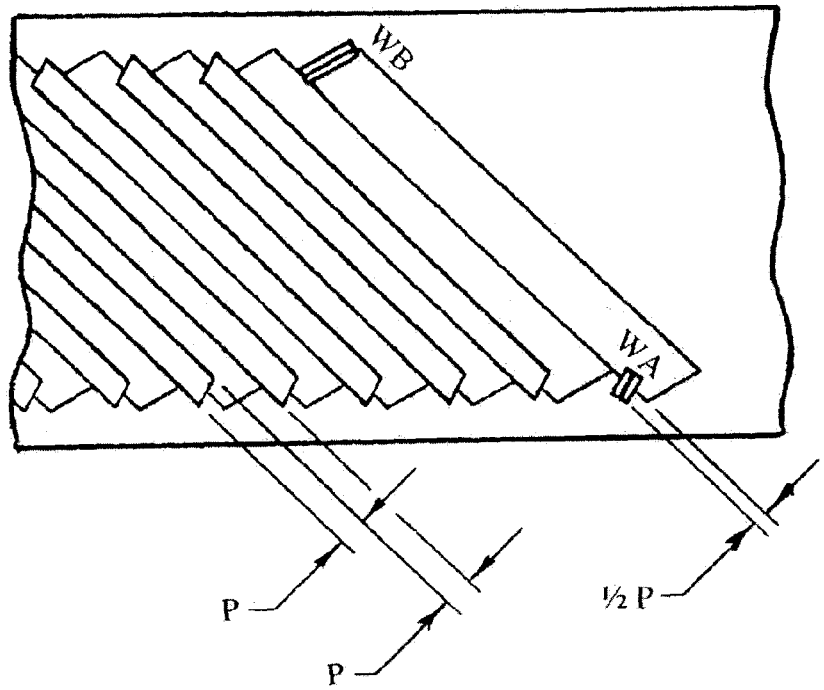
FIG. 16A is a diagrammatic view of a segment of magnetic tape showing a nominal track pattern transduced by a helical scan drive having the rotating drum of FIG. 15A and FIG. 15B.
Figure 16B:
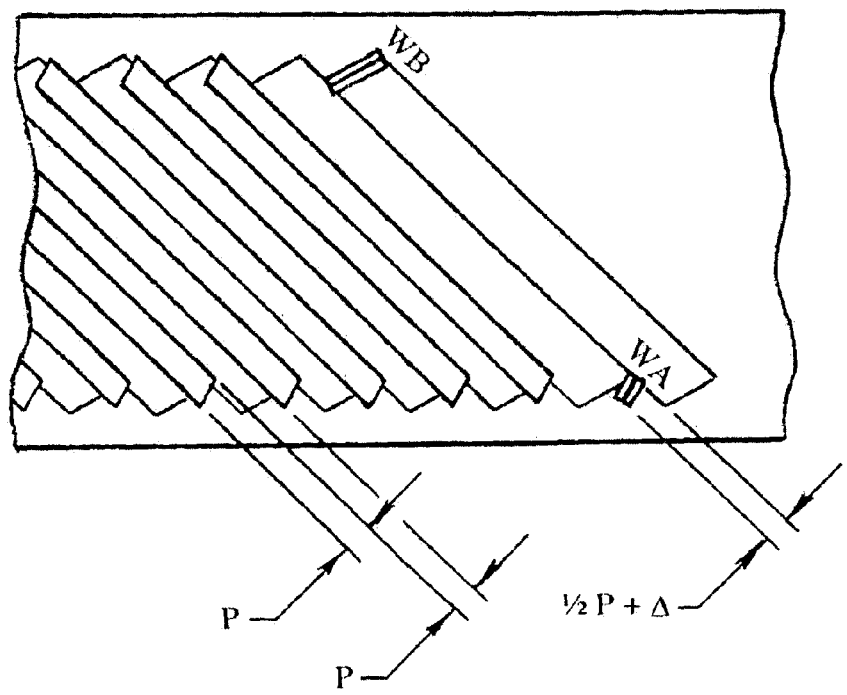
FIG. 16B is a diagrammatic view of a segment of magnetic tape showing a track pattern transduced by a helical scan drive having the rotating drum of FIG. 15A and FIG. 15B, the drum having an error in vertical positioning of the write elements.

A normal track pattern for the drum of the embodiment of FIG. 15A and FIG. 15B is shown in FIG. 16A. In the embodiment of FIG. 15A and FIG. 15B, as in previous embodiments, if there is a small error (Δ) between a nominal vertical separation of the WA element relative to the WB element and an actual vertical separation of the WA element relative to the WB element, there is no effect on the widths (pitch) of the recorded tracks. In fact, the widths (pitch) of all the recorded tracks remain P as illustrated in FIG. 16B.

While the embodiment of FIG. 8A, FIG. 9, and FIG. 10 has described head sets each having two transducing elements, the embodiment of FIG. 15A, FIG. 15B, FIG. 16A, and FIG. 16B has described head sets each having one transducing element. These two embodiments are subsumed in a generic drive structure which encompasses yet other embodiments. The generic drive structure is described by the following characteristics (1) through (5).

Characteristic (1): each head module or "set" has "N" number of write gaps (e.g., write transducing elements) of the same azimuth (where N is any positive integer 1, 2, 3 . . . );

Characteristic (2): The first head module to scan the tape has the "wide" write gaps, spaced 2P apart (P being the desired width or pitch of the tracks), where the effective width of each write gap (in the direction of head motion relative to the tape) is "Wwide", and Wwide>1.0P.

Characteristic (3): The second head module to scan the tape immediately following the first head module has the "narrow" write gaps, also spaced 2P apart, where the effective width of each write gap (in the direction of head motion relative to the tape) is "Wnarrow", and Wnarrow=1.0P.

Characteristic (4): Either head module can have either azimuth

Characteristic (5): The vertical height of the second (narrow) head module relative to the first (wide) head module is set so that (on the tape surface) the bottom edge of the bottom-most write gap in the second (narrow) head module follows a path which is below the bottom edge of the bottom-most track just previously written by the first (wide) head module by a distance H which is dependent on the value of Wwide and an arbitrary number "i" (where i is any non-negative integer 0, 1, 2, 3 . . . ). In the case in which Wwide is greater than 1.0P but less than 2.0P, H is provided by Expression 2. In the case in which Wwide is greater than or equal to 2.0P, H is provided by Expression 3.

$$H=2Pi+0.5(3P-Wwide) \qquad \text{Expression 2}$$

$$H=2Pi+0.5P \qquad \text{Expression 3}$$

Since the pattern on tape repeats at a distance of 2P, the relative vertical separation between the two head modules (regardless of N) can be increased by 2P from any "working position" and it will still be another "working position". The variable "i" is an integer counter which keeps track of how many 2Ps that the Wnarrow module is shifted below its least possible separated postion (i=0) from the Wwide module.

Figure 17:
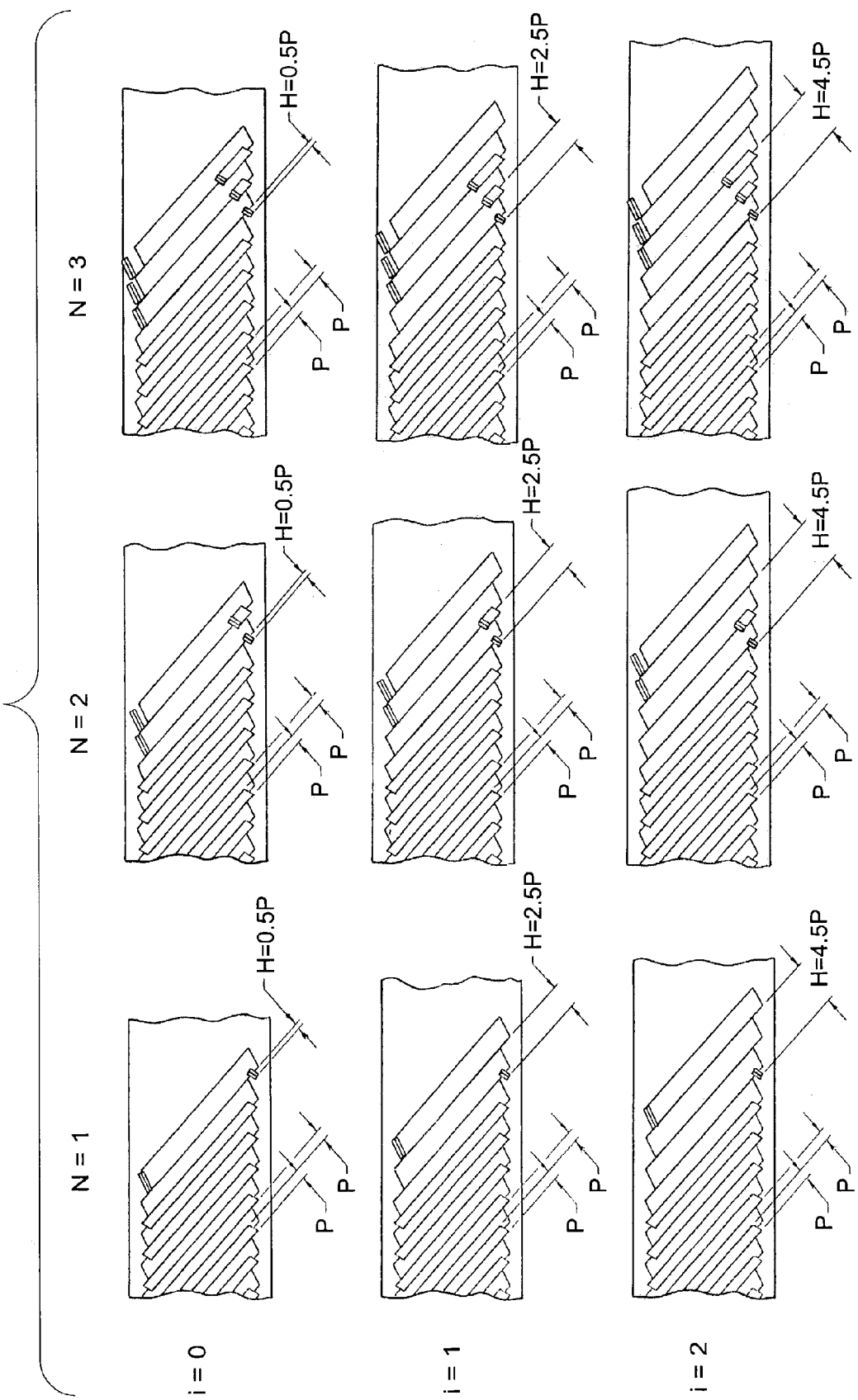
FIG. 17 is a diagrammatic view of nine segments of magnetic tape with corresponding nine different examples of track patterns produced by various embodiments of the new scanner architecture.

FIG. 17 shows nine different examples of track patterns produced by various embodiments of the new scanner architecture, all the embodiments of FIG. 17 having Wwide=2.0P. Each embodiment reflects a different combination of a value of N and a value of i. The first column of FIG. 17 shows three embodiments having N=1 (e.g., one transducing element per set), with the embodiment of the first row of the first column having an i value of 0 and H=0.5P; the embodiment of the second row of the first column having an i value of 1 and H=2.5P; and, the embodiment of the third row of the first column having an i value of 2 and H=4.5P.

The second column of FIG. 17 shows three embodiments having N=2 (e.g., two transducing elements per set), with the embodiment of the first row of the second column having an i value of 0 and H=0.5P; the embodiment of the second row of the second column having an i value of 1 and H=2.5P; and, the embodiment of the third row of the second column having an i value of 2 and H=4.5P. The third column of FIG. 17 shows three embodiments having N=3 (e.g., three transducing elements per set), with the embodiment of the first row of the third column having an i value of 0 and H=0.5P; the embodiment of the second row of the third column having an i value of 1 and H=2.5P; and, the embodiment of the third row of the third column having an i value of 2 and H=4.5P.

While the embodiments of FIG. 17 are illustrated with Wwide=2.0P, it should be understood that the generic structure described by the foregoing characteristics is not limited to Wwide=2.0P. Indeed, FIG. 18A–FIG. 18C illustrate that the generic structure is applicable to far more embodiments. In particular, FIG. 18A-FIG. 18C show examples of N=2 and i=1 with three different widths of Wwide. Specifically, FIG. 18A shows an example of N=2 and i=1 when Wwide<2P. FIG. 18B shows an example of N=2 and i=1 when Wwide=2P. FIG. 18C shows an example of N=2 and i=1 when Wwide>2P. In the FIG. 18A embodiment, H=2Pi+0.5(3P−Wwide)=3.5P−0.5Wwide (since Wwide<2P and i=1). In the FIG. 18B embodiment, H=2Pi+0.5P=2.5P (since Wwide=2P and i=1). In the FIG. 18C embodiment, H=2Pi+ 0.5P=2.5P (since Wwide>2P and i=1).

Transducing Differing Track Patterns

In yet other embodiments subsequently described herein, the foregoing concepts are extended or otherwise applied to helical scan drives which are capable of selectively transducing either of two different track patterns with different track pitch (width) sizes, e.g., $P_1$ and $P_2$, where $P_1$ is less than $P_2$. Drives which are capable of either writing a track pattern having tracks of a first track pitch or writing a track pattern having tracks of a second track pitch implement what is said herein to be a selective dual track width scanning architecture and/or methodology.

Figure 19B:
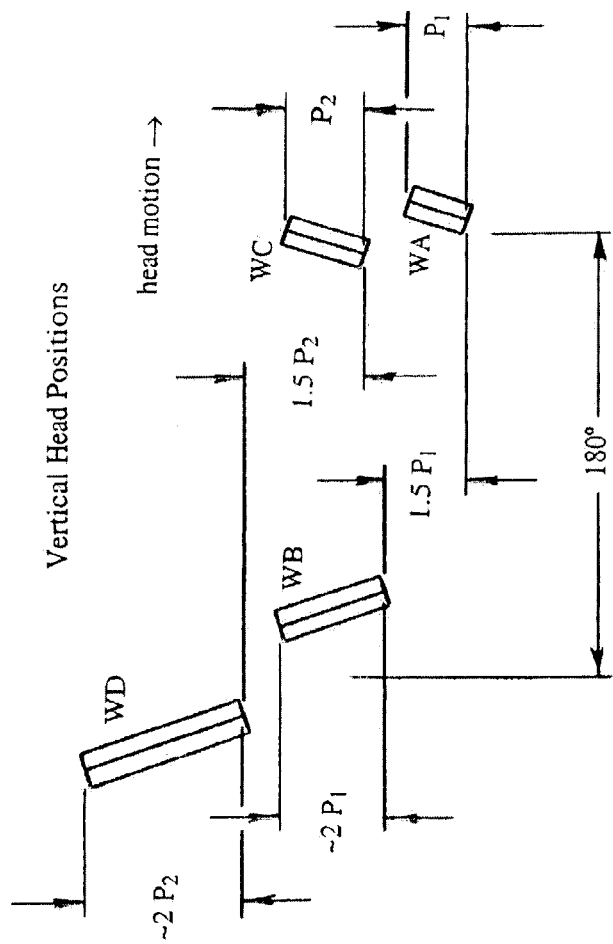
FIG. 19B is a schematic view showing vertical positions of the write elements of the rotating drum of FIG. 19A.
Figure 19A:
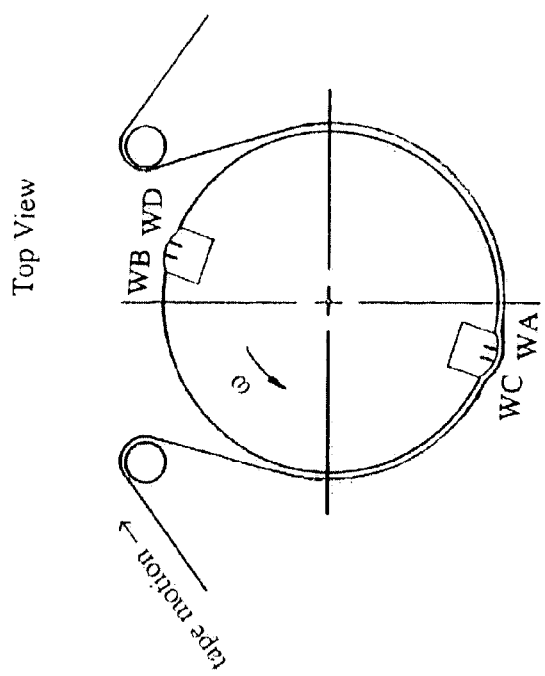
FIG. 19A is a top diagrammatic view of a portion of a rotating drum according to another embodiment.

The rotating drum assembly of FIG. 19A and FIG. 19B has 4 write elements (WA, WB, WC, and WD). As will be illustrated subsequently, the write elements WA and WB can be utilized to transduce tracks having a first desired track pattern (i.e., tracks having a nominal track pitch $P_1$). The write element WA is a + azimuthal element, while the write element WB is a − azimuthal element. Alternatively, the write elements WC and WD can be utilized to transduce tracks having a second desired track pattern (i.e., tracks having a nominal track pitch $P_2$). The write element WC is a + azimuthal element, while the write element WD is a − azimuthal element.

By way of non-limiting example, the WA and WC write elements are depicted in FIG. 19A as (advantageously) being made in the same thin-film head structure, while the WB and WD write elements are in a second thin-film head structure. Combining write transducing elements or write elements into a composite set or module is not mandatory, as (in the manner explained before) each write element could have it's own independent transducing element structure as shown in FIG. 19C (where both WA-WB and WC-WD are diametrically opposed for efficient upstream 1-channel operation).

Figure 19C:
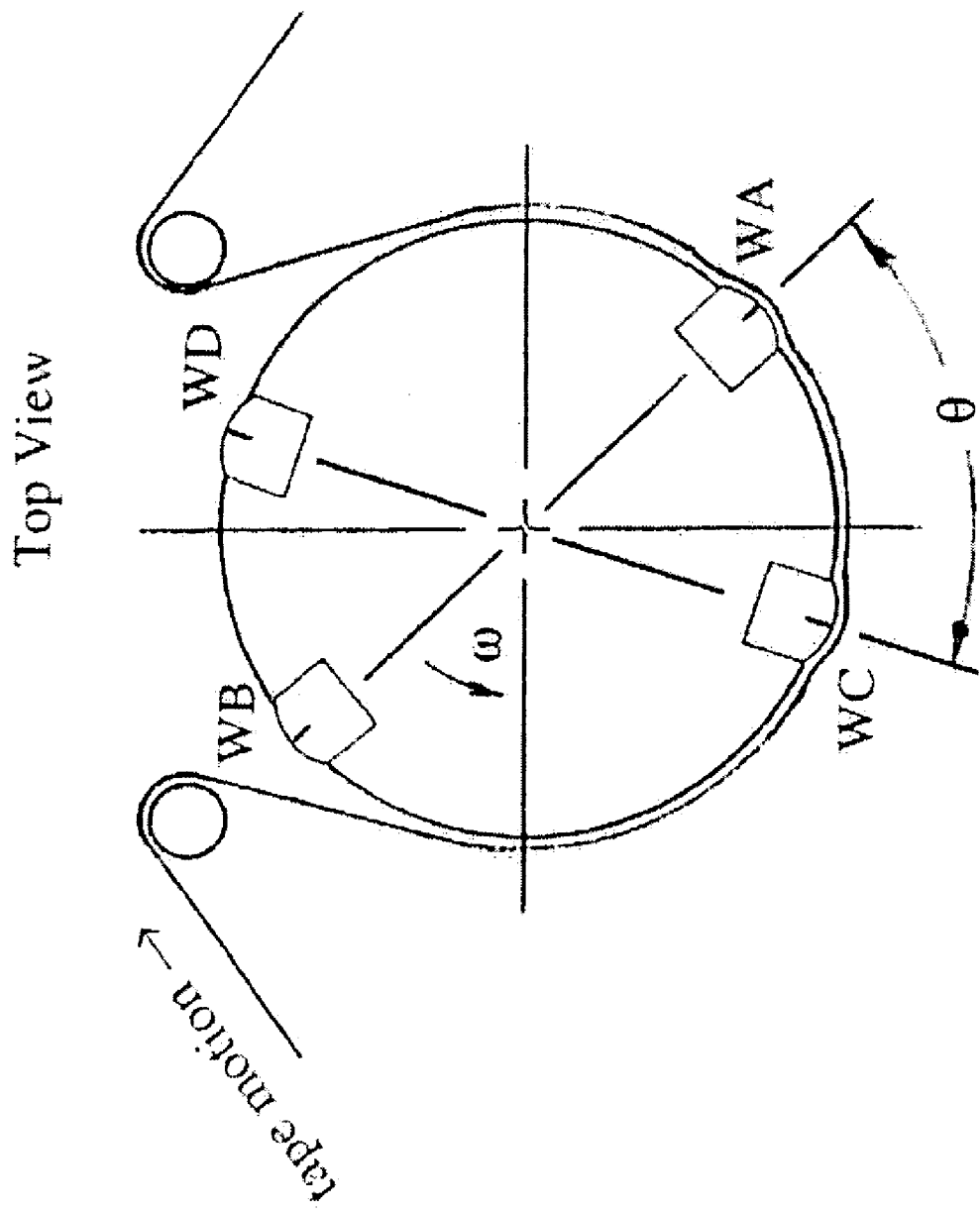
FIG. 19C is a top diagrammatic view of a portion of a rotating drum according to the embodiment of FIG. 19A and FIG. 19B, but wherein the write elements have their own independent head structure rather than a combined head structure.

The write elements shown in FIG. 19C would have the same vertical relationships as shown in FIG. 19A regardless of the angle θ. Even more generally, and thus also encompassing the case of FIG. 19A and FIG. 19B, each write element could have it's own independent transducing element structure and be at any relative angle to its companion as long as the following four conditions (conditions 19-1 through 19-4) are met.

Condition 19-1: WA is a "+" azimuth write element and its effective writing width is set equal to the nominal track pitch of the first desired track pattern ($P_1$). The angular and vertical position of the WA element relative to the WB write element is selected so that during the write operation WA passes $2P_1 i + 0.5P_1$ (with i=0, 1, 2, ...) below the previous WB element pass on the tape surface.

Condition 19-2: WB is a "−" azimuth write element and its effective width is set equal to about two times the nominal track pitch of the first desired track pattern ($2P_1$).

Condition 19-3: WC is a "+" azimuth write element and its effective writing width is set equal to the nominal track pitch of the second desired track pattern ($P_2$). The angular and vertical position of the WC element relative to the WD write element is selected so that during the write operation WC passes $2P_2 i + 0.5P_2$ (with i=0, 1, 2, ...) below the previous WD element pass on the tape surface.

Condition 19-4: WD is a "−" azimuth write element and its effective width is set equal to about two times the nominal track pitch of the second desired track pattern ($2P_2$).

Figure 20:
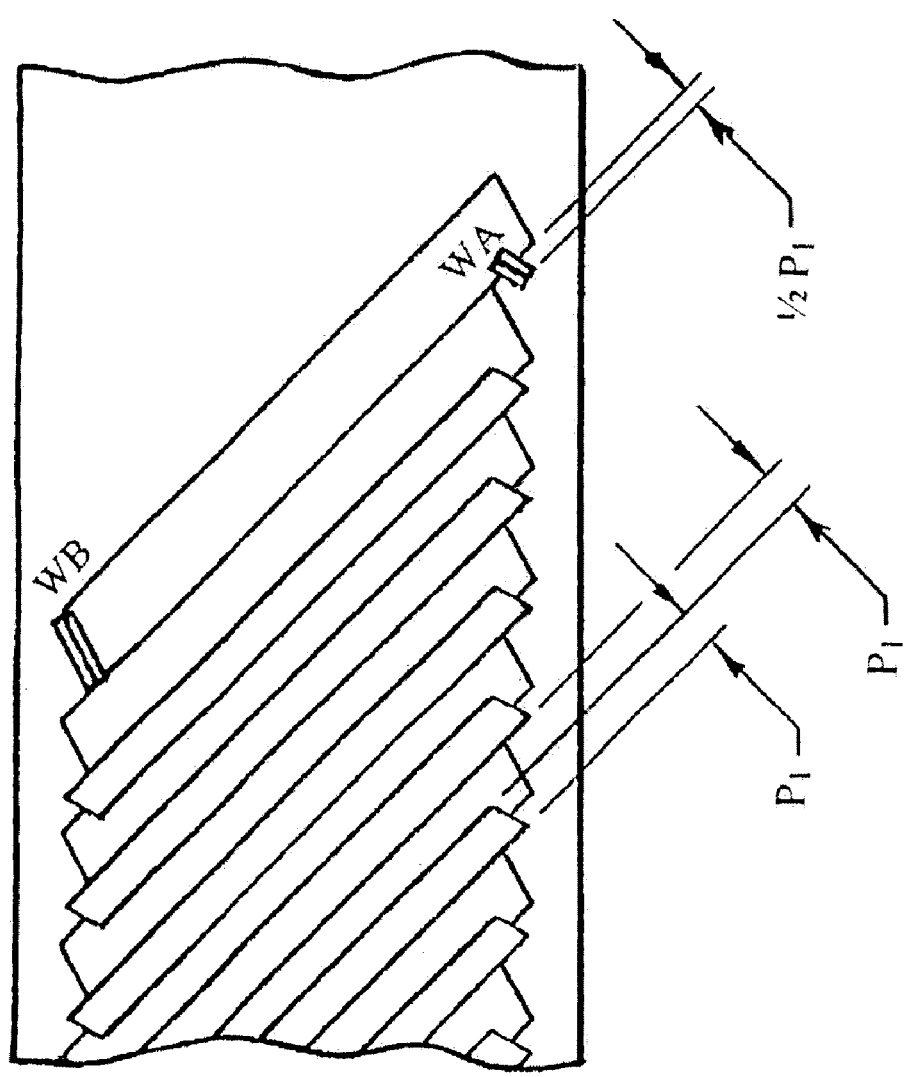
FIG. 20 is a diagrammatic view of a segment of magnetic tape showing a first mode track pattern transduced by a helical scan drive having the rotating drum of FIG. 19A and FIG. 19B or the rotating drum of FIG. 19C and FIG. 19B.
Figure 21:
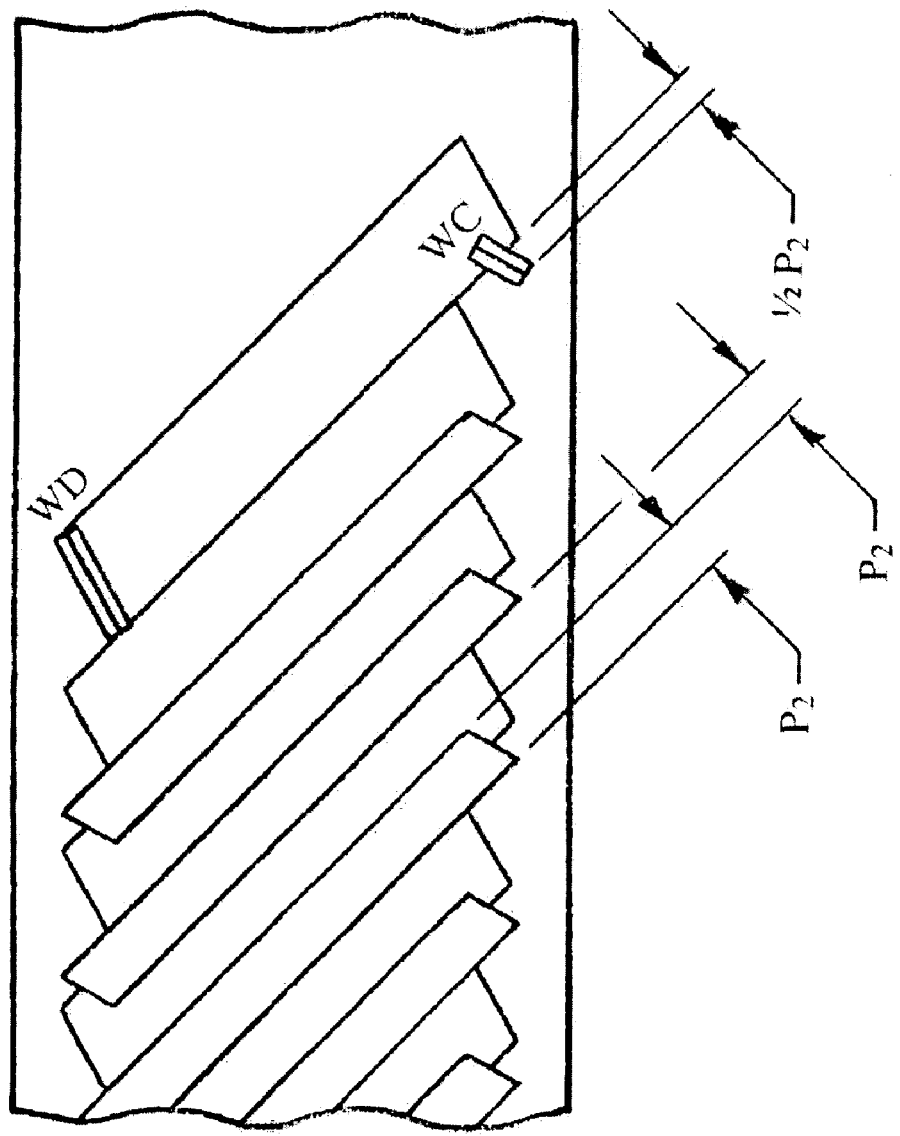
FIG. 21 is a diagrammatic view of a segment of magnetic tape showing a second mode track pattern transduced by a helical scan drive having the rotating drum of FIG. 19A and FIG. 19B or the rotating drum of FIG. 19C and FIG. 19B.

Only two of the four write elements are used for writing each desired track pattern. For example, in a first mode of operation of the helical scan drive illustrated in FIG. 20, write elements WA and WB are used to write the first alternating-azimuth track pattern of nominal track pitch $P_1$ and write elements WC and WD are not used. In a second mode of operation illustrated in FIG. 21, write elements WC and WD are used to write the second alternating-azimuth track pattern of nominal track pitch $P_2$, and write elements WA and WB are not used. Both the track pattern of FIG. 20 and the track pattern of FIG. 21, written with differing transducing elements, benefit from the advantages that the track pattern is not affected if there is a vertical height error, Δ, in the nominal desired height between the two write elements recording each pattern.

Figure 22B:
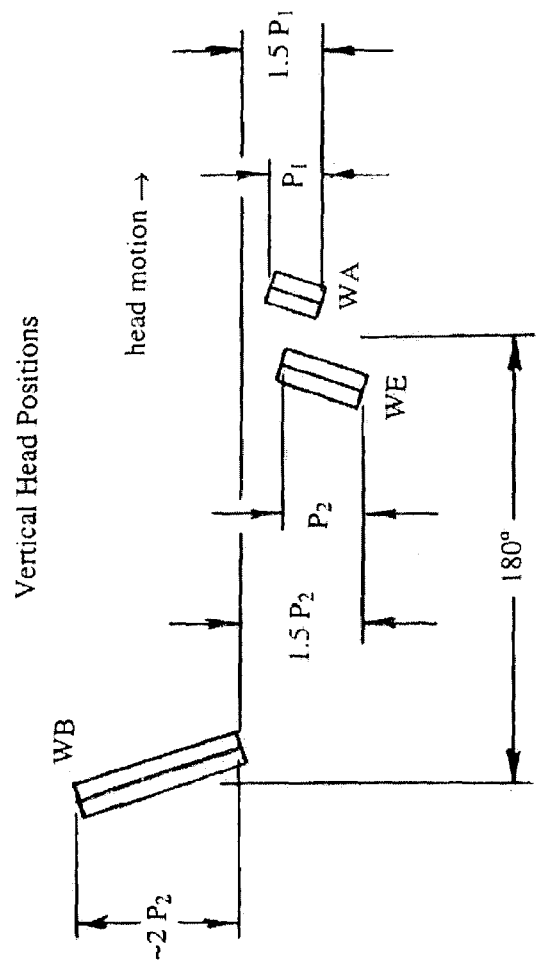
FIG. 22B is a schematic view showing vertical positions of the write elements of the rotating drum of FIG. 22A.
Figure 22A:
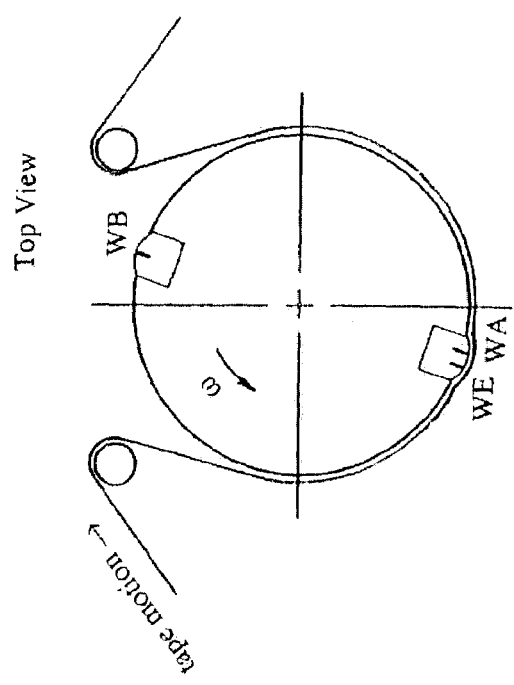
FIG. 22A is a top diagrammatic view of a portion of a rotating drum according to another embodiment.

As showed by the example embodiment of FIG. 22A and FIG. 22B, the same results can be achieved using only three write elements rather than four write elements. In the embodiment of FIG. 22A and FIG. 22B, the rotating drum assembly has three write elements: WA, WB, and WE. As will be illustrated subsequently, the write elements WA and WB can be utilized to transduce tracks having a first desired track pattern (i.e., tracks having a nominal track pitch $P_1$). The write element WA is a + azimuthal element, while the write element WB is a − azimuthal element. Alternatively, the write elements WB and WE can be utilized to transduce tracks having a second desired track pattern (i.e., tracks having a nominal track pitch $P_2$). The write element WE is a + azimuthal element, while the write element WB is a − azimuthal element.

The WA and WE write elements are depicted as (advantageously) being made in the same thin-film transducing element structure (and with near-diametrical relationships for WA-WB and WE-WB), but these are not requirements of the invention (i.e., each write element could have it's own independent head structure and be at any relative angle) as long as the conditions listed below are satisfied.

Conditions of operation for the embodiment of FIG. 22A and FIG. 22B to maintain consistent track pitch regardless of vertical height distance error are the following conditions 20-1 through 20-3.

Condition 20-1: WA is a "+" azimuth write element and its effective writing width is set equal to the nominal track pitch of the first desired track pattern ($P_1$). The angular and vertical position of the WA element relative to the WB write element is selected so that during the write operation WA passes $2P_1 i + 0.5P_1$ (with i=0, 1, 2, ...) below the previous WB element pass on the tape surface.

Condition 20-2: WB is a "−" azimuth write element and its effective width is set about equal to about two times the nominal track pitch of the second desired track pattern ($2P_2$).

Condition 20-3: WE is a "+" azimuth write element and its effective writing width is set equal to the nominal track pitch of the second desired track pattern ($P_2$). The angular and vertical position of the WE element relative to the WB write element is selected so that during the write operation WE passes $2P_2 i + 0.5P_2$ (with i=0, 1, 2, ...) below the previous WB element pass on the tape surface.

Figure 23:
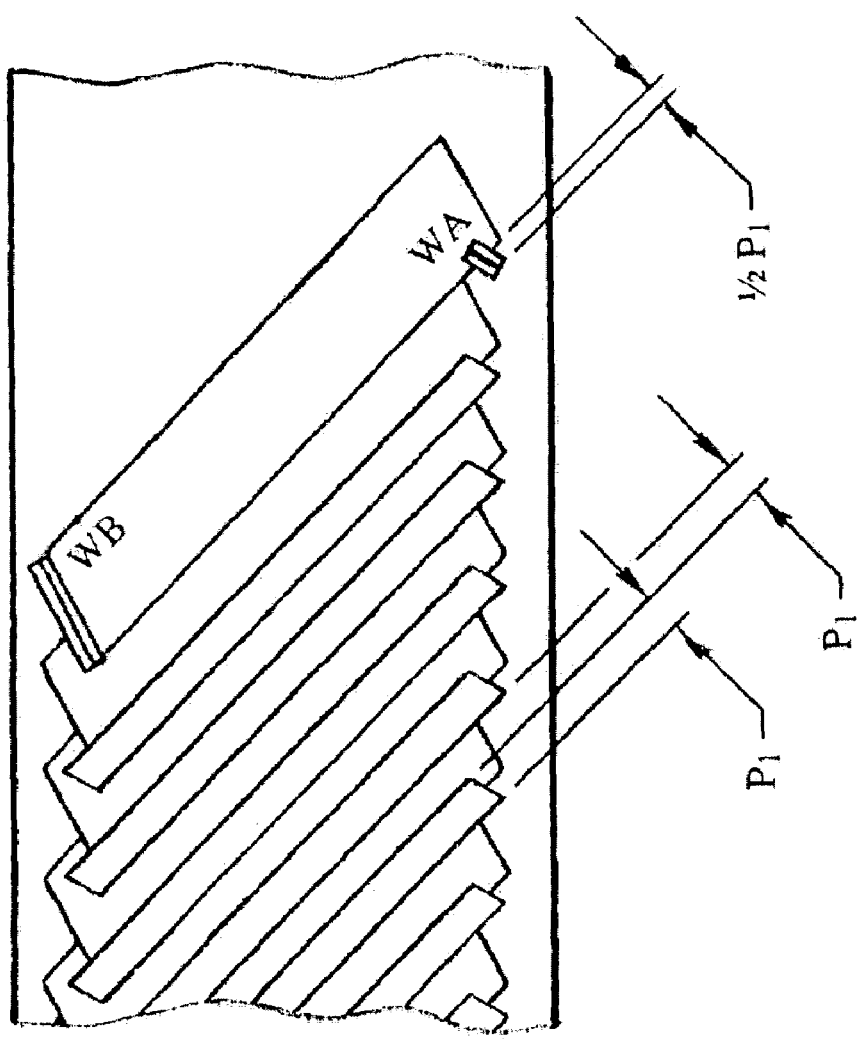
FIG. 23 is a diagrammatic view of a segment of magnetic tape showing a first mode track pattern transduced by a helical scan drive having the rotating drum of FIG. 22A and FIG. 22B.
Figure 24:
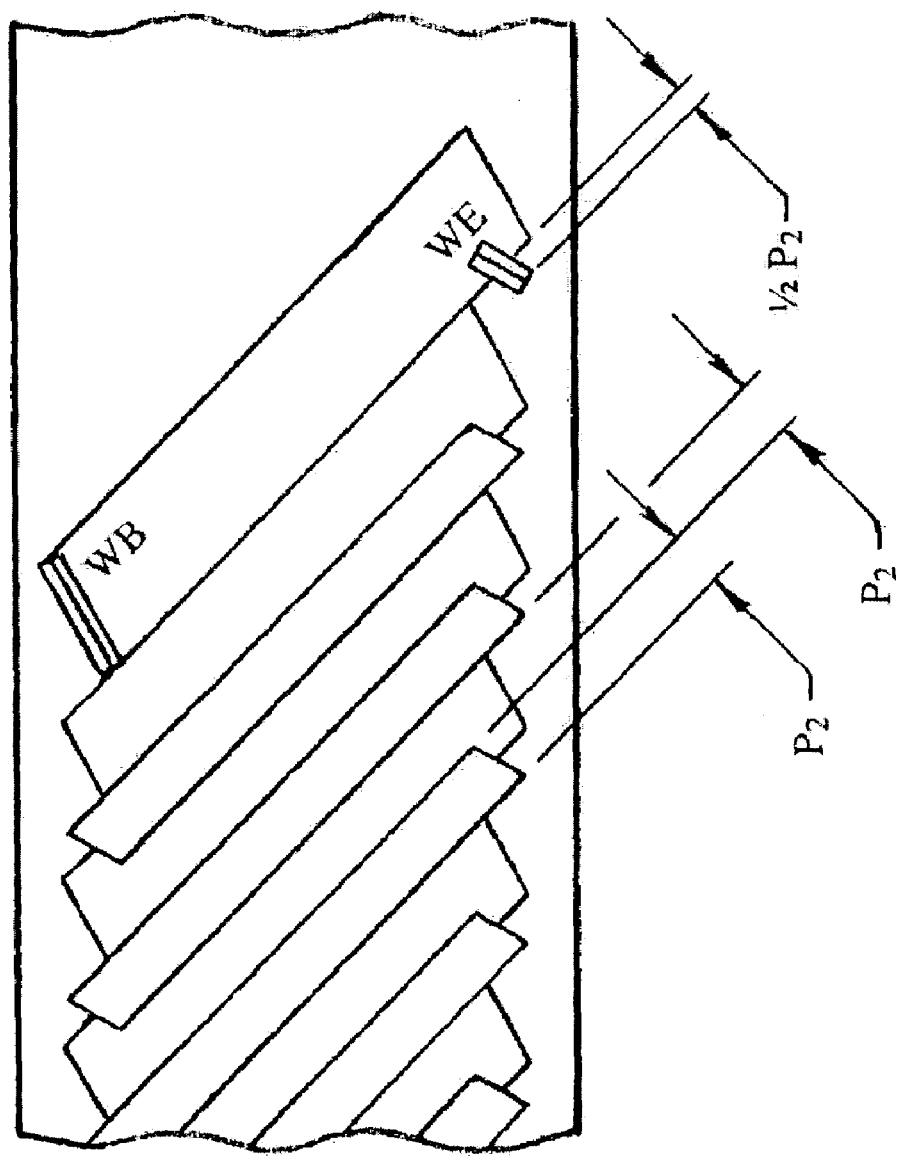
FIG. 24 is a diagrammatic view of a segment of magnetic tape showing a second mode track pattern transduced by a helical scan drive having the rotating drum of FIG. 22A and FIG. 22B.

In the embodiment of FIG. 22A and FIG. 22B, only two of the three write elements are used for writing each desired track pattern. For example, in a first mode of operation of the helical scan drive illustrated in FIG. 23, write elements WA and WB are used to write the first alternating-azimuth track pattern of nominal track pitch $P_1$ and write element WE is not used. In a second mode of operation illustrated in FIG. 24, write elements WB and WE are used to write the second alternating-azimuth track pattern of nominal track pitch $P_2$, and write element WA is not used. Both the track pattern of FIG. 23 and the track pattern of FIG. 24, written with differing transducing elements, benefit from the advantages that the track pattern is not affected if there is a vertical height error, $\Delta$, in the nominal desired height between the write elements recording each pattern.

Figure 25B:
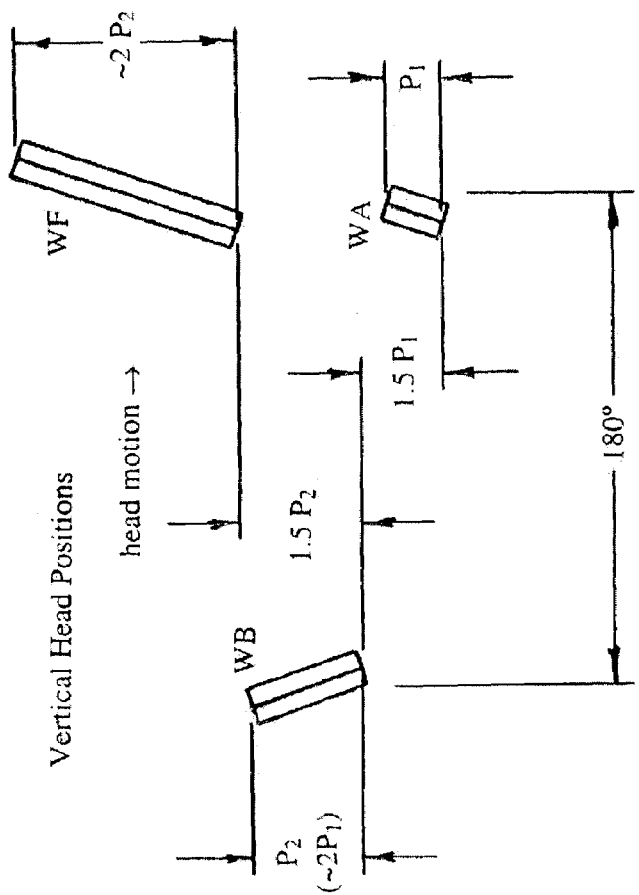
FIG. 25B is a schematic view showing vertical positions of the write elements of the rotating drum of FIG. 25A.
Figure 25A:
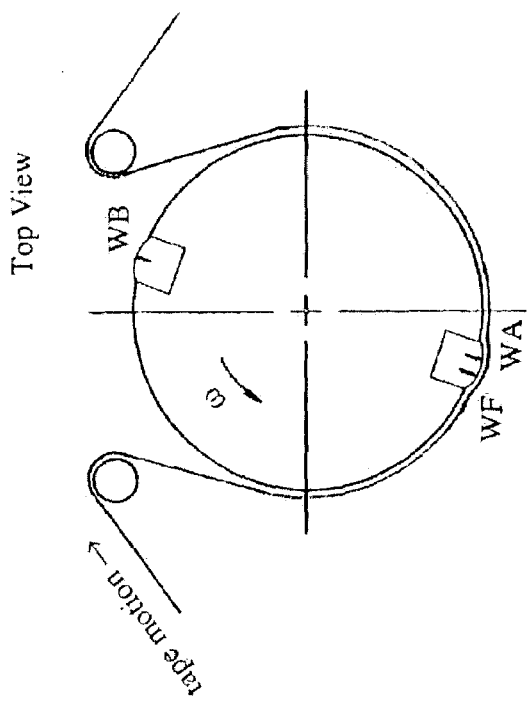
FIG. 25A is a top diagrammatic view of a portion of a rotating drum according to another embodiment.

If the first desired track pitch size, P1, is about ½ the second desired track pitch size P2, then the same results can be achieved with a slightly different arrangement of three write elements (e.g., an alternative arrangement to the embodiment of FIG. 22A and FIG. 22B). This arrangement is shown in the example embodiment of FIG. 25A and FIG. 25B wherein the rotating drum assembly has three write elements WA, WB, and WF. In the embodiment of FIG. 25A and FIG. 25B, the write element WA and write element WF are depicted as (advantageously) being made in the same thin-film head structure (and with near-diametrical relationships for WA-WB and WF-WB), but again these are not requirements of the invention (i.e., each write element could have it's own independent transducing element structure and be at any relative angle). What matters for the embodiment of FIG. 25A and FIG. 25B to moot any vertical height error is that conditions 23-1 through 23-3 be satisfied.

Condition 23-1: WA is a "+" azimuth write element and its effective writing width is set equal to the nominal track pitch of the first desired track pattern ($P_1$). The angular and vertical position of the WA element relative to the WB write element is selected so that during the write operation WA passes $2P_1 i + 0.5P_1$ (with i=0, 1, 2, 3, ...) below the previous WB element pass on the tape surface.

Condition 23-2: WB is a "−" azimuth write element and its effective width is set equal to the nominal track pitch of the second desired track pattern ($P_2$)—which is also about equal to $2P_1$.

Condition 23-3: WF is a "+" azimuth write element and its effective writing width is set equal to about two times the nominal track pitch of the second desired track pattern ($2P_2$). The angular and vertical position of the WF element relative to the WB write element is selected so that during the write operation WB passes $2P_2 i + 0.5P_2$ (with i=0, 1, 2, 3, ...) below the previous WF element pass on the tape surface.

Figure 26:
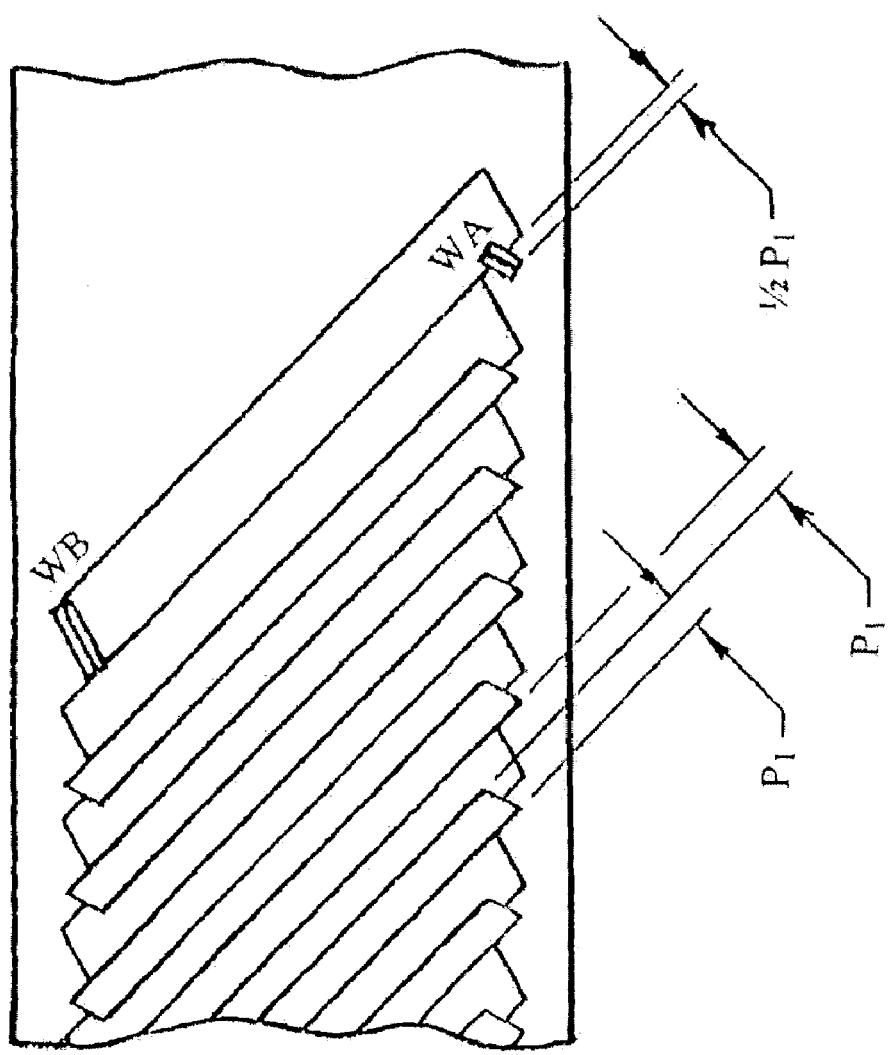
FIG. 26 is a diagrammatic view of a segment of magnetic tape showing a first mode track pattern transduced by a helical scan drive having the rotating drum of FIG. 25A and FIG. 25B.
Figure 27:
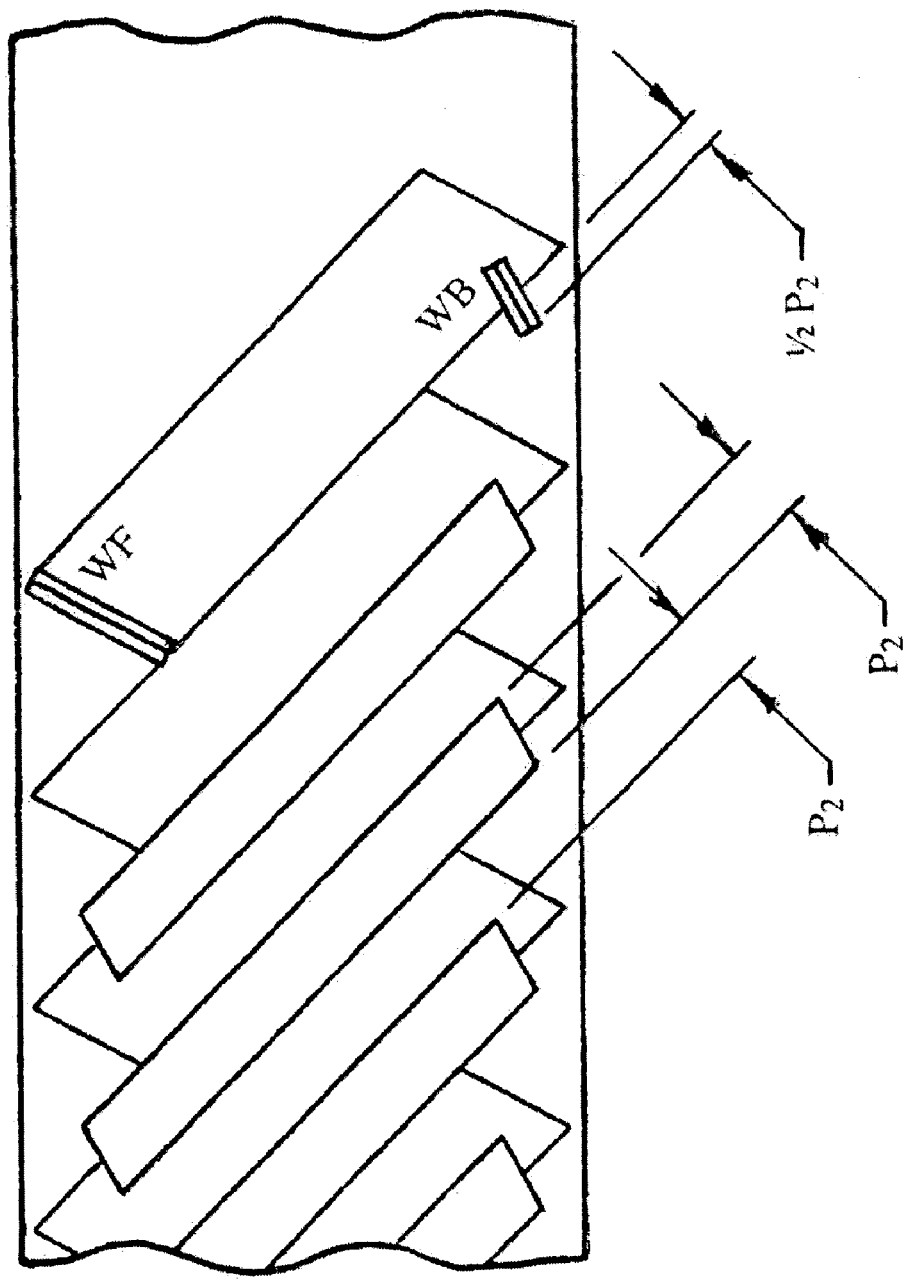
FIG. 27 is a diagrammatic view of a segment of magnetic tape showing a second mode track pattern transduced by a helical scan drive having the rotating drum of FIG. 25A and FIG. 25B.

In the embodiment of FIG. 25A and FIG. 25B, again only two of the three write elements are used for writing each desired track pattern. For example, in a first mode of operation of the helical scan drive illustrated in FIG. 26, write elements WA and WB are used to write the first alternating-azimuth track pattern of nominal track pitch $P_1$ and write element WF is not used. In a second mode of operation illustrated in FIG. 27, write elements WB and WF are used to write the second alternating-azimuth track pattern of nominal track pitch $P_2$, and write element WA is not used. Both the track pattern of FIG. 26 and the track pattern of FIG. 27, written with differing transducing elements, benefit from the advantages that the track pattern is not affected if there is a vertical height error, $\Delta$, in the nominal desired height between the write elements recording each pattern.

Beyond the scanner structure, the drives which implement the dual track width scanning architecture and methodology can be configured in various ways. FIG. 28A–FIG. 28D illustrate basic components of four example configurations of a drive for the scanner of the embodiment of FIG. 19A, FIG. 19B, and FIG. 19C. The scanner of that embodiment has four write transducing elements, i.e., write transducing elements WA, WB, WC, and WD, with heads WA and WB being utilized to transduce tracks of a first track pattern having a nominal width of $P_1$ and heads WC and WD being utilized to transduce tracks of a second track pattern having a nominal width of $P_2$. The tape drive of FIG. 28A resembles that of FIG. 14 (discussed above) in many ways, but has a separate write section for each track pattern and a separate read section for each track pattern. As used herein, "write section" essentially involves a data route or data path of data stored in buffer 56 which is to be written by a write transducing element, while "read section" essentially involves a data route or data path of data acquired from a read transducing element which is directed to buffer 56.

Figure 28A:
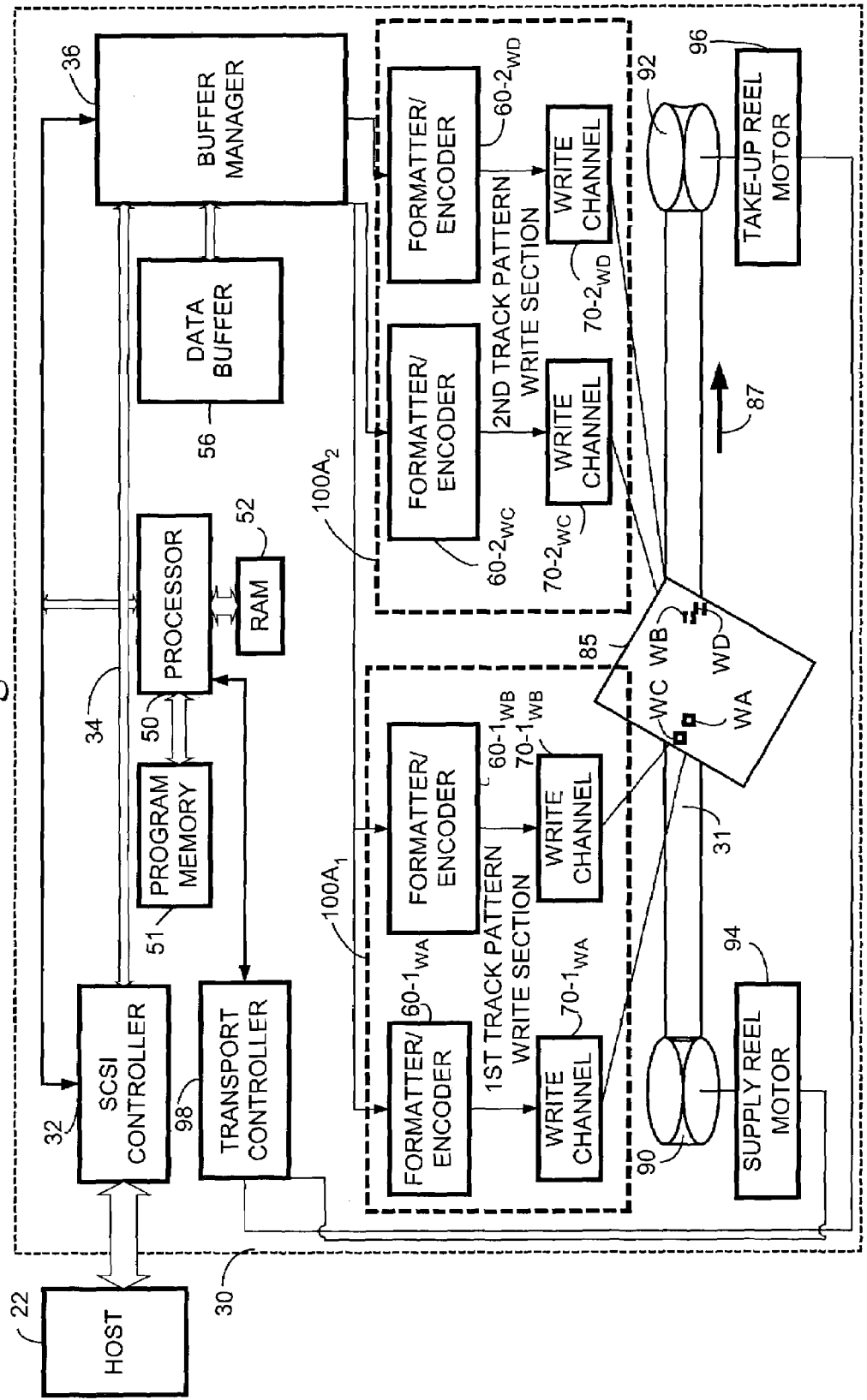
FIG. 28A–FIG. 28D are schematic views of differing implementations of drives which utilize dual track width scanning architecture and methodology.

FIG. 28A thus shows a write section $100A_1$ for the first track pattern (which is written by transducing elements WA and WB) and a write section $100A_2$ for the second track pattern (which is written by transducing elements WC and WD). Each write section has a formatter 60 and write channel 70 for each write transducing element. For example, write section $100A_1$ has formatter $60\text{-}1_{WA}$ and write channel $70\text{-}1_{WA}$ for write transducing element WA and formatter $60\text{-}1_{WB}$ and write channel $70\text{-}1_{WB}$ for write transducing element WB. Likewise, write section $100A_2$ has formatter $60\text{-}2_{WC}$ and write channel $70\text{-}2_{WC}$ for write transducing element WC and formatter $60\text{-}2_{WD}$ and write channel $70\text{-}2_{WD}$ for write transducing element WD. The read sections for the embodiment of FIG. 28A are not illustrated for sake of simplicity, but it will be understood that an essentially analogous structure exists in the read sections as in the write sections, with read channels instead of write channels and deformatter/decoders instead of formatter/encoders.

Thus, the example implementation of FIG. 28A shows a drive comprising two parallel data routes between buffer manager 36 and scanner 85, there being a different data route for the data of each track pattern. Of course, as mentioned above, the two data routes are not both active at the same time, e.g., only one write section is utilized while transducing any given tape.

Figure 28B:
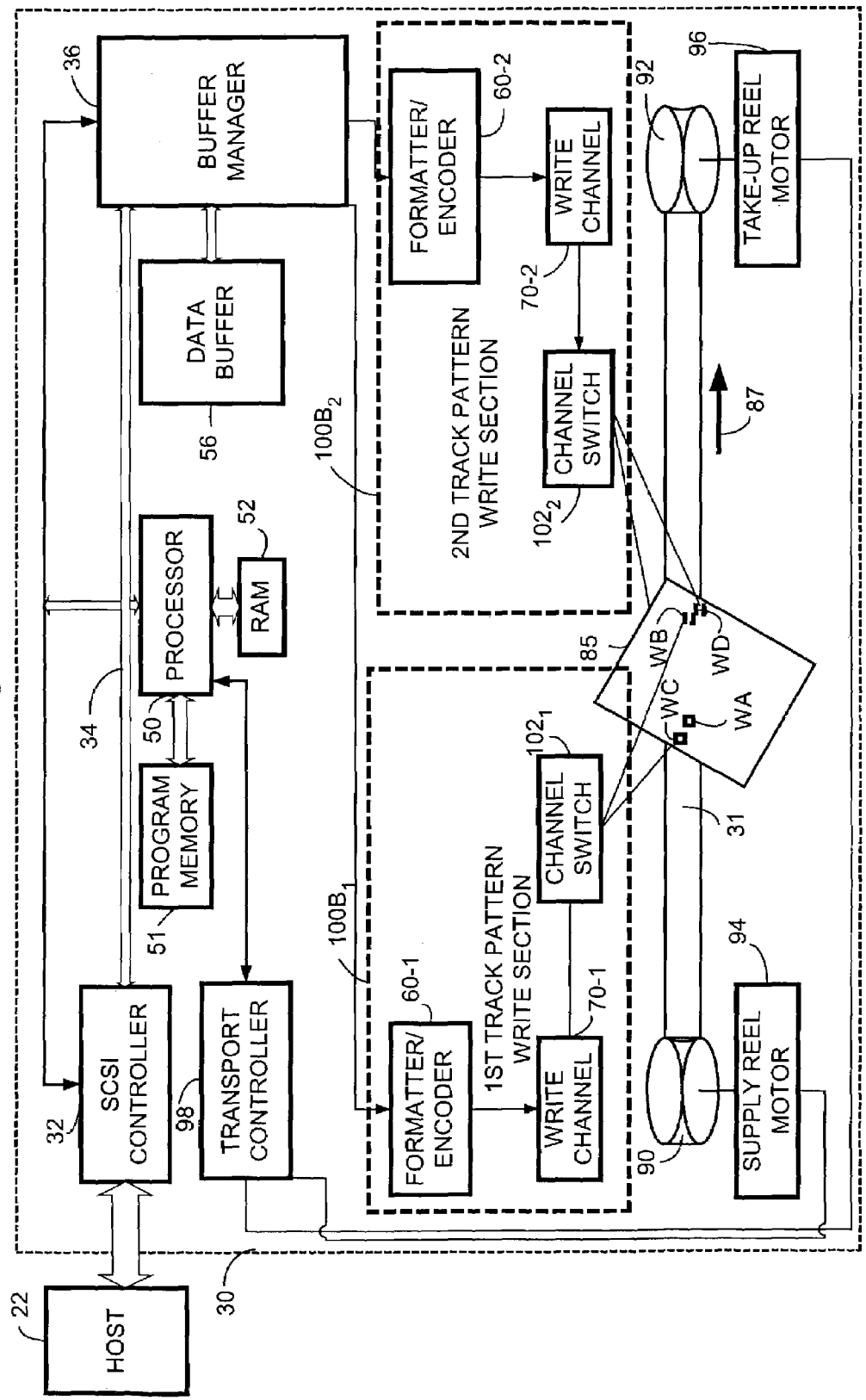

A variation of the parallel route implementation is shown in FIG. 28B. In the FIG. 28B variation, both transducing elements of the same write section share a common formatter/encoder and a common write channel, but the data is switched by action of a switch 102 between the two transducing elements in accordance with angular rotational phase of the scanner. For example, in write section $100B_1$ of FIG. 28B, during a first 180 degree rotation of scanner 85 the data from formatter/encoder 60-1 and write channel 70-1 is applied by switch $102_1$ to transducing element WA, and thereafter during a second 180 degree rotation of scanner 85 the data from formatter/encoder 60-1 and write channel 70-1 is applied by switch $102_1$ to transducing element WB. Comparable operation occurs in second track pattern write section $100B_2$ when the drive is utilized instead to write the second track pattern. As in the embodiment of FIG. 28A, read sections are not shown in FIG. 28B but nevertheless exist for both track patterns.

Figure 28C:
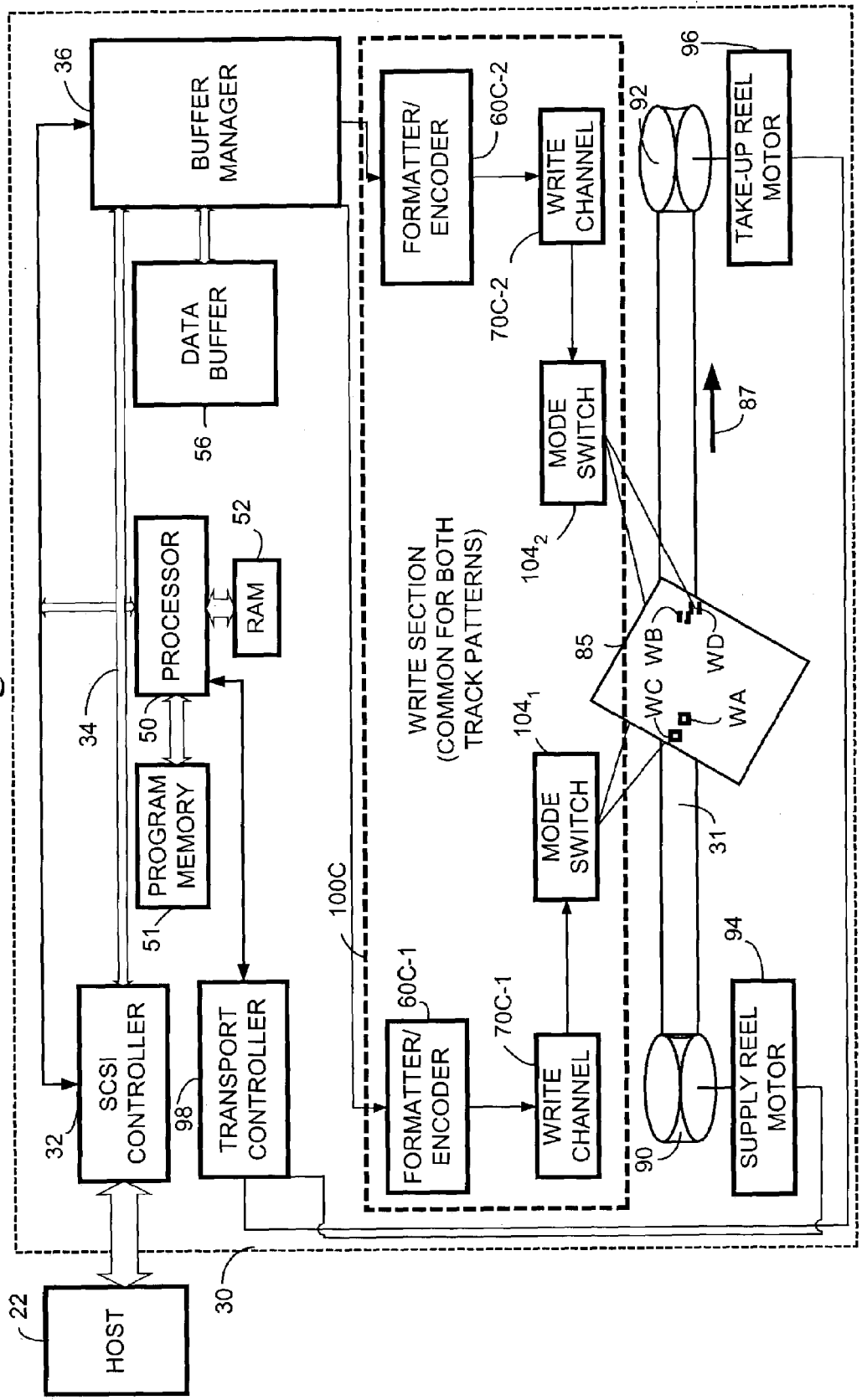

FIG. 28C shows another implementation in which the drive has only one write section 100C. The write section 100C has two formatter/encoders 60C-1 and 60C-2, as well as two write channels 70C-1 and 70C-2. The write section 100C is utilized in both a mode of writing the first track pattern and a mode of writing the second track pattern. In other words, the write section 100C is not dedicated to any particular track pattern mode. The write section 100C further comprises two switches $104_1$ and $104_2$ which switch data to be written between the write transducing elements for the first track pattern when the drive operates in accordance with the first track pattern mode, and write transducing elements for the second track pattern when the drive operates in accordance with the second track pattern mode. Still using the example of FIG. 19A, FIG. 19B, and FIG. 19C embodiment, in the first track pattern mode the switch $104_1$ is operated so that data from write channel 70C-1 is applied to transducing element WA and the switch $104_2$ is operated so that data from write channel 70C-1 is applied to transducing element WB. On the other hand, in the second track pattern mode the switch $104_1$ is operated so that data from write channel 70C-1 is applied to transducing element WC and the switch $104_2$ is operated so that data from write channel 70C-1 is applied to transducing element WD.

Figure 28D:
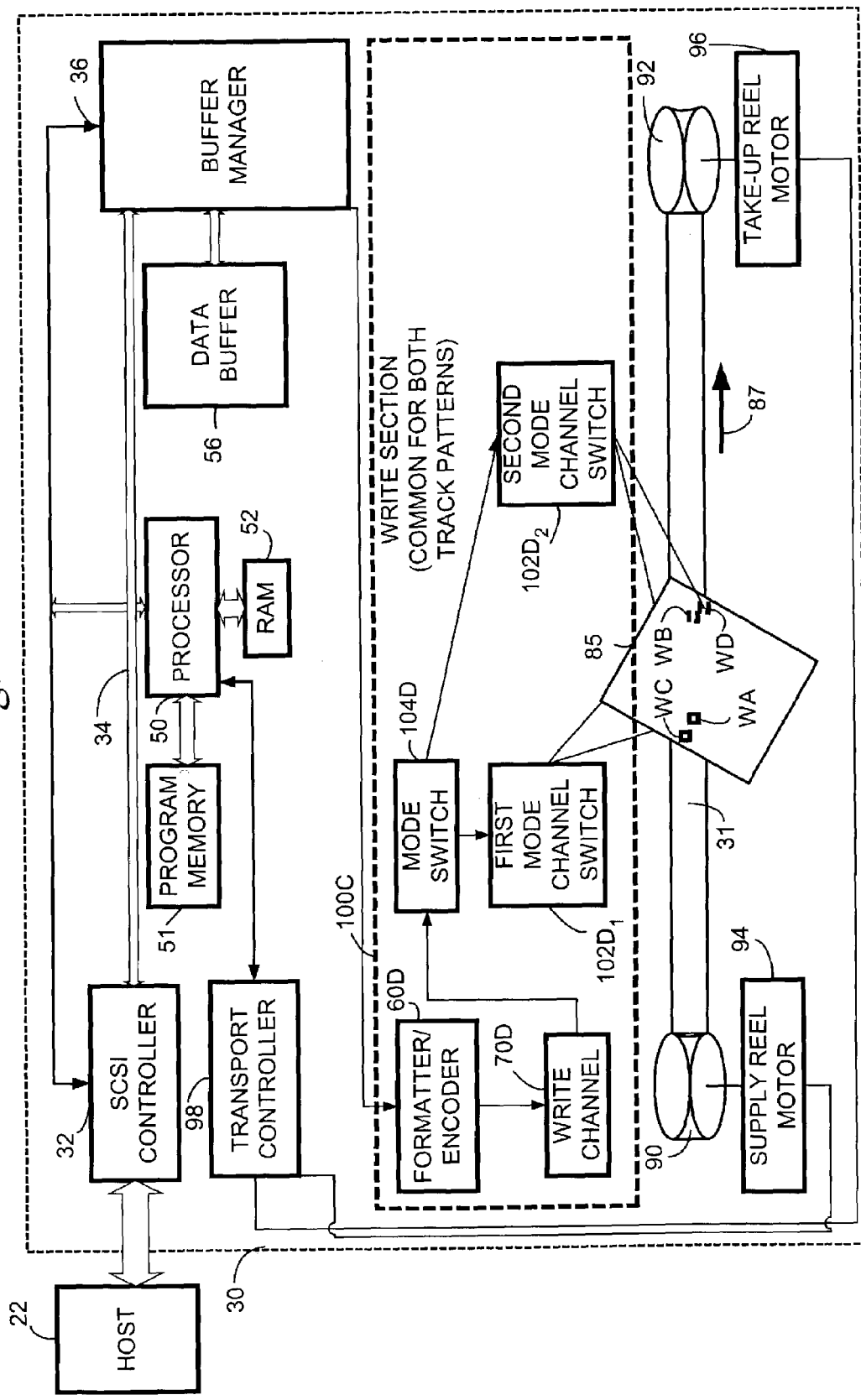

FIG. 28D shows another implementation in which the drive has only one write section, i.e., write section 100D. The write section 100D comprises one formatter/decoder 60D and one write channel 70D. The write channel 70D is connected to apply data to be written to mode switch 104D. When in the first track pattern mode, the mode switch 104D applies the data to first mode channel switch $102D_1$. The first mode channel switch $102D_1$ then selectively switches the data between the two transducing elements WA and WB in accordance with angular rotational phase of the scanner in similar manner as described above in conjunction with FIG. 28B. When in the second track pattern mode, the mode switch 104D applies the data to second mode channel switch $102D_2$. The second mode channel switch $102D_2$ then selectively switches the data between the two transducing elements WC and WD, also in accordance with angular rotational phase of the scanner and in similar manner as described above in conjunction with FIG. 28B.

Advantageously, the magnetic recording apparatus and method described herein records/reproduces an alternating-azimuth recorded track pattern on tape and provides an efficient electrical signal structure, yet the recorded track pattern is not adversely affected by the height error between write transducing elements or independent sets of write transducing elements. The architecture and techniques described herein are particularly effective when the nominal track pitch (i.e., track width) is between three and ten microns. The error between nominal and actual positionings can be as great as almost ½ the nominal track pitch—for example, on a pattern with P=6 microns, the vertical positioning error between the write modules can be as much as 2~2.5 microns.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A helical scan tape recorder comprising:
a rotatable scanner having a vertical direction parallel to an axis of rotation of the scanner;
a first transducing element mounted on the scanner;
a second transducing element mounted on the scanner;
a transport system for transporting magnetic tape proximate the rotatable scanner in a manner so that information is transduced in helical tracks by the transducing elements during revolutions of the scanner;
wherein a width of the transducing elements and a nominal positioning of the transducing elements with respect to the vertical direction are selected whereby the tracks transduced by the first transducing element and the second transducing element have a desired pitch regardless of an error in the vertical direction between the nominal positioning and actual positioning of at least one of the first transducing element and the second transducing element.

2. The apparatus of claim 1, wherein the desired pitch of tracks transduced by the first transducing element and the second transducing element is P, wherein the width of the first transducing element is P; wherein the width of the second transducing element is 2P; and wherein the nominal positioning of the transducing elements is such that a reference point on the first transducing element is separated in the vertical direction by a distance substantially equal to 1.5P from a corresponding reference point on the second transducing element.

3. The apparatus of claim 1, wherein the desired pitch of tracks transduced by the first transducing element and the second transducing element is P, wherein the width of the first transducing element is P; wherein the width of the second transducing element is 2P; and wherein the nominal positioning of the transducing elements is such that a reference point on the first transducing element is separated in the vertical direction by a distance which causes the first transducing element to travel a path on the tape which is nominally ½ P below a previous path of the second transducing element.

4. The apparatus of claim 1, wherein the first transducing element belongs to a first set of plural transducing elements and the second transducing element belongs to a second set of plural transducing elements, and wherein the first set of transducing elements and the second set of transducing elements are so mounted on the scanner that all tracks transduced by the first transducing element and the second transducing element have a desired pitch regardless of an error in physical distance separating the sets of transducing elements.

5. The apparatus of claim 1, wherein the first transducing element is mounted on a first module and the second transducing element is mounted on a second module, and wherein the first module and the second module are so mounted on the scanner that all tracks transduced by the first transducing element and the second transducing element have a desired pitch regardless of an error in physical distance separating the modules.

6. The apparatus of claim 5, wherein the first module further comprises a third transducing element; wherein the second module further comprises a fourth transducing element; and wherein the modules are mounted on the scanner so that the first transducing element and the third transducing element transduce respective tracks during a first angular phase of the rotation of the scanner, and so that the second transducing element and the fourth transducing element transduce, during a second angular phase of the rotation of the scanner, respective tracks which partially overlap a previously-transduced track, and wherein the tracks on the tape alternate according to differing azimuthal orientation.

7. The apparatus of claim 6, wherein the transducing elements of the first module have a first azimuthal orientation and the transducing elements of the second module have a second azimuthal orientation which is different from the first azimuthal orientation.

8. The apparatus of claim 6, wherein the modules are mounted on the scanner so the second transducing element transduces a track which partially overlaps a track transduced by the first transducing element and a track transduced by the third transducing element.

9. The apparatus of claim 6, wherein the modules are mounted on the scanner so the second transducing element transduces a track which preferably resides a distance H below a track transduced by the first transducing element, wherein H=3P+½(P−W1), wherein P is a nominal pitch of the tracks, and wherein W1 is a width of the first transducing element.

10. The apparatus of claim 9, wherein the fourth transducing element transduces a track which is preferably a distance 2P above the track transduced by the second transducing element.

11. The apparatus of claim 5, wherein a first angular phase is offset from a second angular phase by essentially one hundred eighty degrees.

12. The apparatus of claim 1, wherein the desired pitch is P; wherein the first transducing element comprises a first module with the first transducing element having an effective width Wwide>1.0P; wherein the second transducing head comprises a second module with the second transducing element having an effective width Wnarrow=1.0P; wherein the second module scans the tape following the first module; and wherein the nominal positioning with respect to the vertical direction of the second module relative to the first module is selected so that on the tape a bottom edge of a bottom-most transducing element of the second module follows a path which is below a bottom edge of a bottom-most track just previously recorded by the first module by a distance H, a value of the distance H being one of the following:

H=2Pi+0.5(3P−Wwide) when Wwide is greater than 1.0P but less than 2.0P;

H=2Pi+0.5P when Wwide is greater than or equal to 2.0P; and wherein i is a non-negative integer.

13. A helical scan tape recorder comprising:
a rotatable scanner;
a first group of transducing elements mounted on the scanner for use in transducing tracks of a first track pattern, the tracks of the first track pattern having a first pattern nominal track pitch;
a second group of transducing elements mounted on the scanner for use in transducing tracks of a second track pattern, the tracks of the second track pattern having a second pattern nominal track pitch;
a transport system for transporting magnetic tape proximate the rotatable scanner in a manner so that information is transduced by a utilized group of transducing elements during a revolution of the scanner, the utilized group being one of the first group and the second group;
wherein the transducing elements are situated on the scanner at predetermined nominal positions whereby, regardless of which group is selected as the utilized group, the tracks transduced by the utilized group have a consistent track pitch regardless of an error in the vertical direction in physical distance separating the transducing elements of the utilized group.

14. The apparatus of claim 13, wherein the first group and the second group each comprise a first azimuthal angle orientation transducing element and a second azimuthal angle orientation transducing element, wherein the first group and the second group each transduce an alternating azimuthal track pattern.

15. The apparatus of claim 14, wherein:
the first azimuthal angle orientation transducing element of the first group has an effective transducing width $P_1$ substantially equal to the first pattern nominal track pitch and a second azimuthal angle orientation transducing element of the first group has an effective transducing width substantially equal to twice the first pattern nominal track pitch ($2P_1$);
the first azimuthal angle orientation transducing element of the second group has an effective transducing width $P_2$ substantially equal to the second pattern nominal track pitch and a second azimuthal angle orientation transducing element of the second group has an effective transducing width substantially equal to twice the second pattern nominal track pitch ($2P_2$); and
wherein the predetermined nominal positions are such that, during a transducing operation:
the first azimuthal angle orientation transducing element of the first group travels a first predetermined distance below a previous track transduced by the second azimuthal angle orientation transducing element of the first group, the first predetermined distance being $2P_1i+0.5P_1$; and
the first azimuthal angle orientation transducing element of the second group travels a second predetermined distance below a previous track transduced by the second azimuthal angle orientation transducing element of second first group, the second predetermined distance being $2P_2i+0.5P_2$; and
wherein i is a non-negative integer.

16. The apparatus of claim 15, wherein the first azimuthal angle orientation is a positive azimuthal angle orientation and the second azimuthal angle orientation is a negative azimuthal angle orientation.

17. The apparatus of claim 14, wherein:
the first azimuthal angle orientation transducing element of the first group has a vertical separation with respect to the second azimuthal angle orientation transducing element of the first group equal to 1.5 times the first pattern nominal track pitch, and wherein
the first azimuthal angle orientation transducing element of the second group has a vertical separation with respect to the second azimuthal angle orientation transducing element of the first group equal to 1.5 times the second pattern nominal track pitch.

18. The apparatus of claim 14, wherein the first group comprises a first azimuthal angle orientation transducing element of the first group and the second group comprises a first azimuthal angle orientation transducing element of the second group, wherein a common transducing element belongs to the first group and the second group, the common transducing element being a second azimuthal angle orientation transducing element.

19. The apparatus of claim 18, wherein
the first azimuthal angle orientation transducing element of the first group has an effective transducing width $P_1$ substantially equal to the first pattern nominal track pitch;
the first azimuthal angle orientation transducing element of the second group has an effective transducing width $P_2$ substantially equal to the second pattern nominal track pitch;
the common transducing element has an effective transducing width substantially equal to twice the second pattern nominal track pitch ($2P_2$); and
wherein the predetermined nominal positions are such that, during a transducing operation:

the first azimuthal angle orientation transducing element of the first group travels a first predetermined distance below a previous track transduced by the common transducing element of the first group, the first predetermined distance being $2P_1i+0.5P_1$; and the first azimuthal angle orientation transducing element of the second group travels a second predetermined distance below a previous track transduced by the common transducing element, the second predetermined distance being $2P_2i+0.5P_2$; and wherein i is a non-negative integer.

20. The apparatus of claim 19, wherein the first azimuthal angle orientation is a positive azimuthal angle orientation and the second azimuthal angle orientation is a negative azimuthal angle orientation.

21. The apparatus of claim 19, wherein:

the first azimuthal angle orientation transducing element of the first group has a vertical separation with respect to the common transducing element equal to 1.5 times the first pattern nominal track pitch, and wherein the first azimuthal angle orientation transducing element of the second group has a vertical separation with respect to the common transducing element equal to 1.5 times the second pattern nominal track pitch.

22. The apparatus of claim 18, wherein the first azimuthal angle orientation transducing element of the first group has an effective transducing width $P_1$ substantially equal to the first pattern nominal track pitch;

the first azimuthal angle orientation transducing element of the second group has an effective transducing width $2P_2$ substantially equal to twice the second pattern nominal track pitch;

the common transducing element has an effective transducing width substantially equal to the second pattern nominal track pitch $P_2$; and wherein the predetermined nominal positions are such that, during a transducing operation:

the first azimuthal angle orientation transducing element of the first group travels a first predetermined distance below a previous track transduced by the common transducing element of the first group, the first predetermined distance being $2P_1i+0.5P_1$; and the common transducing element of the second group travels a second predetermined distance below a previous track transduced by the first azimuthal angle orientation transducing element of the second group, the second predetermined distance being $2P_2i+0.5P_2$; and, wherein i is a non-negative integer.

23. The apparatus of claim 22, wherein the first azimuthal angle orientation is a positive azimuthal angle orientation and the second azimuthal angle orientation is a negative azimuthal angle orientation.

24. The apparatus of claim 22, wherein:

the first azimuthal angle orientation transducing element of the first group has a vertical separation with respect to the common transducing element equal to 1.5 times the first pattern nominal track pitch, and wherein the common transducing element of the second group has a vertical separation with respect to the first azimuthal angle orientation transducing element of the second group equal to 1.5 times the second pattern nominal track pitch.

25. The apparatus of claim 22, wherein the first pattern nominal track pitch is about one half the second pattern nominal track pitch.

26. A helical scan tape recorder comprising:

a rotatable scanner having plural transducing elements mounted thereon, at least one of the transducing element having a first azimuth angle orientation and at least another of the transducing elements having a second azimuth angle orientation;

a transport system for transporting magnetic tape proximate the rotatable scanner in a manner so that information is transduced in helical tracks by the transducing elements during revolutions of the scanner;

wherein the transducing elements are arranged so that the tracks are transduced:

(1) in a temporal order as follows: plural tracks having the first azimuth orientation followed by plural tracks having the second azimuth orientation;

(2) in a spatial order on the tape in which the tracks alternate in azimuth orientation between the first azimuth orientation and the second azimuth orientation.

27. The apparatus of claim 26, wherein N number of transducing elements have the first azimuth angle orientation and N number of transducing elements have the second azimuth angle orientation, wherein the transducing elements are arranged so that the tracks are written in a temporal order as follows: N number of first azimuth angle orientation tracks; N number of second azimuth angle orientation tracks; N number of first azimuth angle orientation tracks; N number of second azimuth angle orientation tracks, and so forth, N being an integer greater than or equal to two.

28. The apparatus of claim 26, wherein the first azimuth angle orientation is a positive azimuth angle orientation and the second azimuth angle orientation is a negative azimuth angle orientation.

29. A method of transducing helical tracks relative to a magnetic tape media, the method comprising:

rotating a scanner having plural transducing elements mounted thereon, at least one of the transducing element having a first azimuth angle orientation and at least another of the transducing elements having a second azimuth angle orientation;

transporting magnetic tape proximate the rotatable scanner in a manner so that information is transduced in helical tracks by the transducing elements during revolutions of the scanner;

transducing the tracks in a temporal order of plural tracks having the first azimuth angle orientation followed by plural tracks having the second azimuth angle orientation, and yet the tracks being situated on the tape in a spatial order in which the tracks alternate in azimuth angle orientation between the first azimuth angle orientation and the second azimuth angle orientation.

30. The method of claim 29, N number of transducing elements have the first azimuth angle orientation and N number of transducing elements have the second azimuth angle orientation, further comprising transducing the tracks in a temporal order as follows: N number of first azimuth angle orientation tracks; N number of second azimuth angle orientation tracks; N number of first azimuth angle orientation tracks; N number of second azimuth angle orientation tracks, and so forth, N being an integer greater than or equal to two.

31. The method of claim 29, wherein the first azimuth angle orientation is a positive azimuth orientation and the second azimuth angle orientation is a negative azimuth angle orientation.

\* \* \* \* \*